(12) United States Patent
Brun et al.

(10) Patent No.: US 6,767,139 B2
(45) Date of Patent: Jul. 27, 2004

(54) SIX-PORT OPTICAL PACKAGE AND METHOD OF MANUFACTURING

(75) Inventors: Marc G. Brun, Vaux le Penil (FR); Scott M. Hellman, Aliso Viejo, CA (US); Heinrich G. Muller, Rancho Palos Verdes, CA (US); Paul A. Townley-Smith, Irvine, CA (US); Michael Ushinsky, Irvine, CA (US)

(73) Assignee: Avanex Corporation, Fremont, CA (US)

( * ) Notice: Subject to any disclaimer, the term of this patent is extended or adjusted under 35 U.S.C. 154(b) by 0 days.

(21) Appl. No.: 09/945,373

(22) Filed: Aug. 31, 2001

(65) Prior Publication Data

US 2002/0110322 A1 Aug. 15, 2002

Related U.S. Application Data

(63) Continuation-in-part of application No. 09/599,168, filed on Jun. 22, 2000, now Pat. No. 6,343,166.

(51) Int. Cl.[7] .............................................. G02B 6/36
(52) U.S. Cl. ........................... 385/84; 385/33; 385/78; 385/68; 385/66
(58) Field of Search ..................... 385/60, 61, 64–68, 385/71–74, 78–85, 33, 34

(56) References Cited

U.S. PATENT DOCUMENTS

| | | | |
|---|---|---|---|
| 4,482,202 A | 11/1984 | Nagao | 385/39 |
| 5,264,909 A | 11/1993 | Rochester | 356/73.1 |
| 5,502,781 A | 3/1996 | Li et al. | 385/4 |
| 5,604,629 A | 2/1997 | Hunter et al. | 359/359 |
| 5,615,052 A | 3/1997 | Doggett | 359/811 |
| 5,619,605 A | 4/1997 | Ueda et al. | 385/80 |
| 5,675,683 A | 10/1997 | Takahashi et al. | 385/78 |
| 5,682,452 A | 10/1997 | Takahashi | 385/85 |
| 5,692,081 A | 11/1997 | Takahashi | 385/78 |
| 5,737,104 A | 4/1998 | Lee et al. | 359/124 |

(List continued on next page.)

FOREIGN PATENT DOCUMENTS

| | | | |
|---|---|---|---|
| EP | 0404052 | 12/1993 | G02B/6/34 |
| EP | 0421654 | 7/1994 | G02F/1/09 |
| EP | 0 722 101 A1 | 7/1996 | G02B/6/26 |
| WO | 9302373 | 2/1993 | G02B/6/26 |
| WO | 9612986 | 5/1996 | G02B/6/26 |
| WO | WO0163338 A | 8/2001 | G02B/26/02 |

OTHER PUBLICATIONS

Structural Analysis in Microelectronics and Fiber Optics—1997—(pp. 34–54 of The Electrical and Electronic Packing Division—vol. 21).
8 pages from www.ma.man.ac.uk, May 23, 2001.
5 pages From Fluent Incorporated Website, May 23, 2001.
Publication entitled Applications of Grin–Rod Lenses in Optical Fiber Communications Systems (pp. 1127–1136; dated Apr. 1980).

*Primary Examiner*—Brian Healy
*Assistant Examiner*—Kevin S Wood
(74) *Attorney, Agent, or Firm*—Moser, Patterson & Sheridan L.L.P.

(57) ABSTRACT

An apparatus and method of manufacturing multiple-port optical devices and packages includes the steps of positioning pairs of screened optical fibers in a precision ferrule of a collimating assembly; determining a desired angle of incidence (AOI) for an optical element; positioning the assembly in a movable fixture; moving the assembly into engagement with an optical element holder unit having an optical element mounted thereto; micro-tilting the element holder to actively align the optical element and fibers to preferably achieve an insertion loss (IL) less than about 0.2 dB; and curing adhesive to initially secure the aligned optical element assembly.

19 Claims, 18 Drawing Sheets

U.S. PATENT DOCUMENTS

| | | | |
|---|---|---|---|
| 5,748,820 A | * 5/1998 | Le Marer et al. | 385/76 |
| 5,768,458 A | 6/1998 | Ro et al. | 385/79 |
| 5,799,121 A | 8/1998 | Duck et al. | 385/47 |
| 5,917,626 A | 6/1999 | Lee | 359/131 |
| 6,040,944 A | 3/2000 | Pan et al. | 359/590 |
| 6,084,994 A | 7/2000 | Li et al. | 385/31 |
| 6,134,360 A | 10/2000 | Cheng et al. | 385/39 |
| 6,168,319 B1 | 1/2001 | Francis | 385/79 |
| 6,173,106 B1 | 1/2001 | DeBoynton et al. | 385/140 |
| 6,192,175 B1 | 2/2001 | Li et al. | 385/27 |
| 6,322,256 B1 | * 11/2001 | Inada et al. | 385/84 |
| 6,393,191 B1 | * 5/2002 | Chen et al. | 385/139 |
| 6,433,924 B1 | * 8/2002 | Sommer | 359/337.1 |
| 6,454,465 B1 | * 9/2002 | Uschitsky et al. | 385/79 |
| 6,477,289 B1 | * 11/2002 | Li | 385/16 |

* cited by examiner

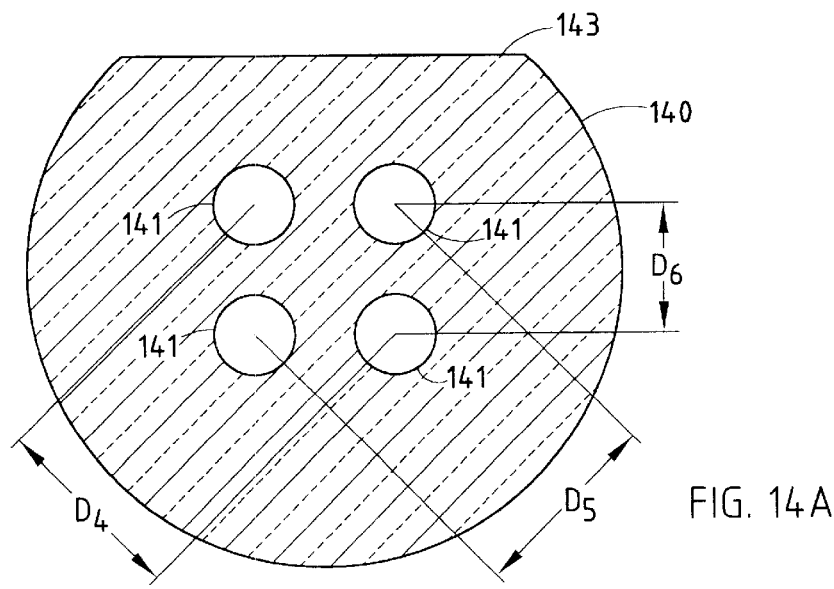
FIG. 14A
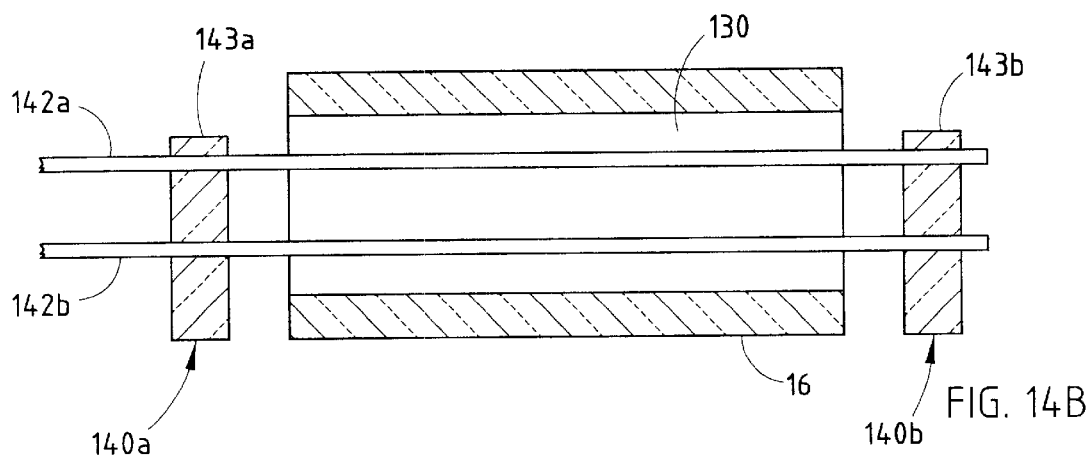
FIG. 14B
| FERRULE SD | COLLIMATOR AOI | FILTER AOI RANGE | |
|---|---|---|---|
| 125 | 1.84 | 1.800 | 1.866 |
| 129 | 1.91 | 1.866 | 1.930 |
| 134 | 1.97 | 1.930 | 1.992 |
| 138 | 2.03 | 1.992 | 2.052 |
| 142 | 2.09 | 2.052 | 2.111 |
| 146 | 2.15 | 2.111 | 2.167 |
| 149 | 2.21 | 2.167 | 2.223 |
| . | . | . | . |
| . | . | . | . |
| . | . | . | . |
FIG. 15

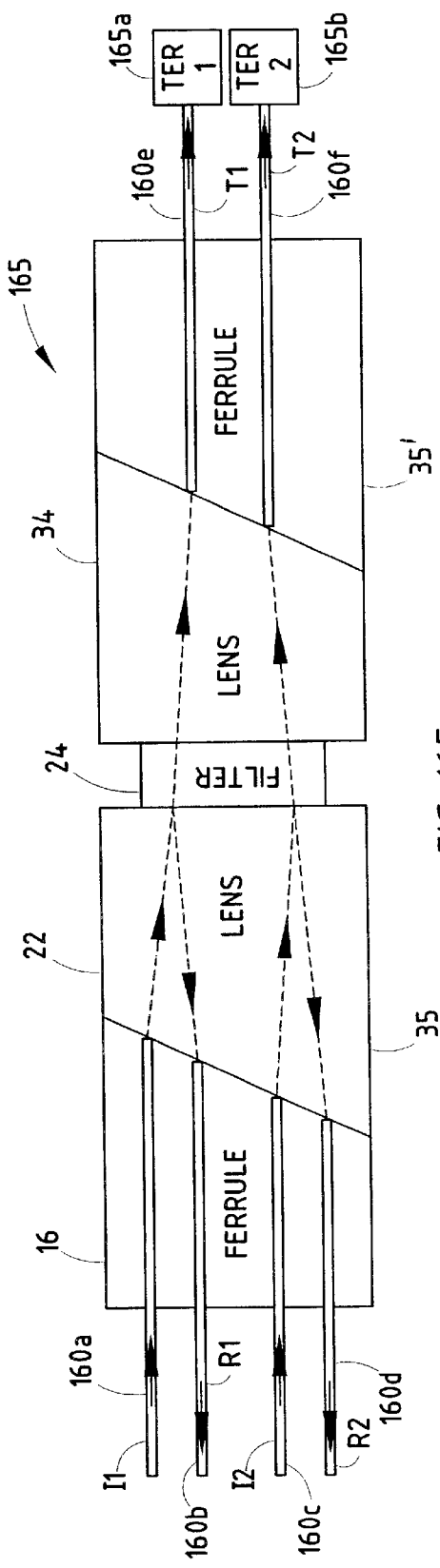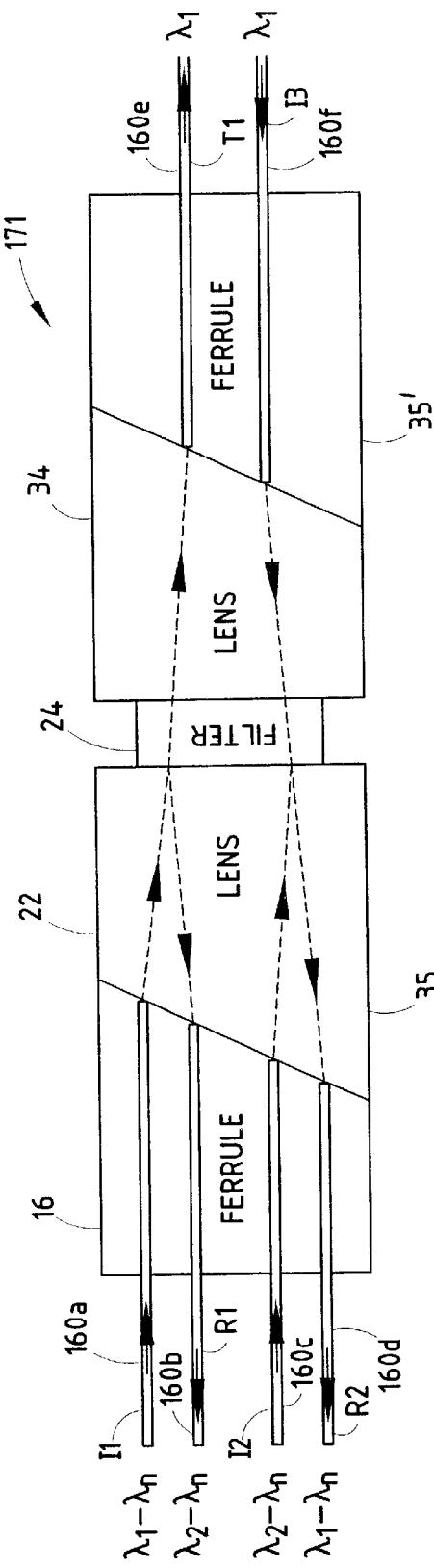

SIX-PORT OPTICAL PACKAGE AND METHOD OF MANUFACTURING

CROSS-REFERENCE TO RELATED APPLICATION

This application is a continuation-in-part of U.S. patent application Ser. No. 09/599,168, filed on Jun. 22, 2000, entitled "THREE-PORT FILTER AND METHOD OF MANUFACTURE," by Scott M. Hellman et al., now U.S. Pat. No. 6,343,166, the entire disclosure of which is incorporated herein by reference.

BACKGROUND OF THE INVENTION

1. Field of the Invention

The present invention relates to optical telecommunication systems and, in particular, to an apparatus and method of manufacturing optical devices employed in such telecommunication systems.

2. Technical Background

Up to three port filtering and isolating packages are widely used in local and long distance optical telecommunication networks. These networks comprise various spectral shaping and isolating optical assemblies as parts of dense wavelength division multiplexing (DWDM) systems. The necessity to design reliable optical devices for such systems, which are subject to various thermal and mechanical loads during their 20 to 25 year lifetime, is of significant importance. A typical example of such optical devices is an optical filter assembly. A typical optical filter assembly comprises two (input and reflective) optical glass fibers inserted into a dual-capillary ferrule to produce a fiber-ferrule sub-assembly, a GRIN lens, and a filter. The optical components of the filter assembly are embedded into an insulating glass tube, which in turn is mechanically protected by a metal housing. In a typical 3-port package the above dual-fiber filtering assembly is combined with an output collimating assembly leading to a single optical fiber. These filter assemblies typically exhibit insertion losses higher than desired, resulting in degraded overall performance of the communications system or module. The problem is particularly acute during exposure to ambient operating conditions where temperature is variable.

Typical input glass ferrules employ one of two designs. A single capillary suitable for containing multiple glass fibers or separate circular capillaries for each fiber have been used, each with relatively short (0.7–1.2 mm) fiber-receiving conical lead-in ends. With such input ferrules, the optical fiber is subjected to an S-bending over the short conical end portion which typically exceeds 50% of the fiber diameter (for a fiber having a 125 μm diameter) on a span of about 6 to 10 diameters in length. This excessive micro bending increases the insertion losses. Although the multi-capillary design reduces the lateral deflection of fiber interconnects compared to the elliptical single-capillary design, the short length of the cone end of such ferrules cannot reduce the micro bending of the fiber and its inherent insertion loss. Fiber-ferrule subassemblies employing such ferrules are manufactured by inserting the optical fibers stripped of their polymer coating into the respective ferrule capillaries; epoxy bonding the fibers into the ferrule capillaries, including the conical end portions; grinding and polishing an angled facet on the fiber-ferrule; and depositing on the polished surface an anti-reflection (AR) coating. Once finished, the fiber-ferrule is aligned and assembled with the collimating GRIN lens and then embedded into the insulating glass tube, which, in turn, is protected by a metal housing.

There are two different technical solutions used in the design of bonds securing the components of an optical assembly. A low compliance bond between thermally well matched glass fibers and the glass ferrule is an approach commonly used by some manufacturers. The adhesives used are heat-curable epoxies with high Young's modulus (E>100,000 psi) and moderate to high thermal expansion coefficients ($\alpha$=40–60 $10^{-6\circ}$ $C.^{-1}$). A typical example would be 353 ND EPO-TEK epoxy adhesive. In addition, the bond thickness used is very small.

Silicon adhesives are used to bond thermally mismatched glass tubes with metal housings and glass optical elements with metal holders. In these joints, a high compliance design is used. The silicones, which can be cured between 20–150° C. in the presence of moisture, are typically characterized by an extremely low Young's modulus (E<500 psi) and high thermal expansion ($\alpha$=180–250 $10^{-6\circ}$ $C.^{-1}$). A typical example would be DC 577 silicone, which can be used to bond, for example, a metal optical filter holder to a GRIN lens.

Adhesive bonding with subsequent soldering or welding is used to encapsulate a filtering assembly into a three-port package of a DWDM module. A precise alignment achieved during initial assembly of a filter prior to final packaging can be easily decreased due to the adhesive curing process and the high temperature thermal cycles associated with soldering or welding during the final packaging of the components. Such manufacturing processes and resulting components have several problems resulting from stresses on the optical components due to the thermal contraction mismatch between the glass and metal materials, polymerization shrinkage in adhesive bonds, and structural constraints induced by bonding and final soldering during encapsulation. These stresses lead to displacements of optical components during bonding and soldering, resulting in 0.3 to 1 dB or greater increases in the insertion loss.

Such a filter package enclosure, which is typically formed of six to eight concentric protective units, has micron transverse tolerances. Maintaining these tolerances requires precision machining, time-consuming alignment, and soldering with frequent rework. As a result of these limitations, the optical performance specifications are lowered and cost is increased. As an example, soldering typically includes several re-flow cycles. This induces local thermal stresses in the nearby adhesive bonds and leads to the degradation of the polymer adhesive, resulting in repositioning of optical components and a shift in the filter spectral performance. With such design, soldering may also result in the contamination of optical components through direct contact with molten solder and/or flux.

However, for many applications, it is desirable to obtain a high accuracy, thermally compensated optical multiple-port package that can be relatively inexpensive, reliable, and have a low insertion loss. Additionally, a package design should be adequate not only to mechanically protect the fragile optical components, but also to compensate for and minimize the thermally induced shift in spectral performance. Further, it is desirable to obtain a multiple-port package, such as six port packages, with the same qualities since they further reduce costs, reduce size, and also result in reduced insertion loss. Thus, there exists a need for such optical packages and a process for manufacturing such optical packages, which is miniaturized, has a low insertion loss, is inexpensive to manufacture, and which results in a device having reliable, long-term operation.

SUMMARY OF THE INVENTION

The present invention provides an improved optical assembly (e.g., optical filter assembly) with a low insertion loss (IL) and provides an assembly of the optical components, such as input ferrules, collimating lenses, and filters, utilizing bonding adhesives in a manner which allows the alignment of the individual components relative to one another with a precision and a manufacturability that makes it possible to produce commercial devices having five, six or more ports. This heretofore had not been achieved. In one aspect, the invention includes an improved input ferrule and filter holder which permits active alignment and bonding through the utilization of UV and thermally curable adhesives and improved thermal curing to greatly reduce relevant internal stresses in the subassembly so formed. For assemblies having multiple pairs of fibers (e.g., five or more port devices), the invention also provides improved fiber ferrule designs, alignment methods, and methods to permit the manufacture of devices that have low IL, operate over a wide temperature range, are reliable, and cost effective.

In one aspect of the invention, improvements to fiber ferrules are provided including capillary designs and tolerances. The invention provides designs for capillaries which resist movement of the optical fibers during adhesive curing, soldering, welding, and environmental thermal changes. One technique uses washers to precisely position optical fibers in a capillary. Yet another aspect of the invention is the selection of optical fibers based on geometric properties such as: outer (cladding) diameter, circularity of the cladding (ovality), and core concentricity. In another aspect, the invention teaches matching the separation distance (SD) between optical fibers and the relationship to angle of incidence (AOI) of the optical filter. Tolerances for the separation distance are provided which make possible the commercial manufacturability of multiple-port devices with five, six or more ports. The optical alignment process becomes more critical and complex as the number of ports increases and therefore the invention provides methods for handling this more complex alignment. A method of selecting an output collimating assembly is also provided.

Methods embodying the present invention include the steps of actively aligning a filter holder and filter to a collimator assembly including a GRIN, a spheric, or other collimating lens mounted thereto, axially separating the filter holder and lens in a movable fixture, placing a UV and thermally curable adhesive on the periphery of the lens, moving the lens into engagement with the filter holder having a filter mounted therein, aligning the collimator assembly with respect to the filter holder while monitoring the input and reflected signals of the optical fibers coupled to the lens for insertion loss less than about 0.2 dB, and applying UV radiation through the filter end of the filter holder to initially cure the aligned subassembly. In an embodiment of the invention, the subassembly is subsequently thermally cured through an accelerated dark cure sequence followed by a final high temperature curing. In another embodiment of the invention, UV radiation is applied to the filter holder/lens interface through one or more apertures formed in the side of the filter holder which overlaps the lens. The UV light source may be dithered such that UV radiation uniformly covers the cylindrical interface between the filter holder and the outer surface of the lens. In yet another embodiment of the invention, the filter and lens are pre-aligned prior to the application of adhesive by monitoring the input and reflected signals of the fibers while adjusting the X–Y positioning for a maximum detected signal.

In a preferred method of manufacturing the invention, subsequent to the UV curing process, the assembly is cured through a stress relaxation cycle at about 40–500° C. for two to four hours followed by a thermal curing cycle of about 95–110° C. for one to two hours.

In one embodiment of the invention, an input ferrule is employed with an input cone having an axial length greater than about 2.5 mm to reduce S-bending of input fiber, thereby minimizing resultant insertion losses. In another embodiment of the invention, a generally cylindrical filter holder having an annular seat formed in one end for receiving a filter and a lens-receiving aperture at an opposite end having an internal dimension which allows micro-tilting of the filter holder relative to the lens is used to provide an alignment of the filter at an angle of less than about 1° to the axis of the lens. The preferred filter holder includes slots or openings in the lateral surface such that UV light enters and cures adhesive between the lens and filter holder. An optical filter assembly of a preferred embodiment of the present invention includes such an improved ferrule and/or a filter holder coupled in alignment with one another in a suitable housing.

The methods and apparatus described herein facilitate the manufacture of a multiple-port optical device which results in several advantages. For example, in a six port device having two pair of optical fibers in the input collimating assembly, one filter operates with at least two transmitted light beams and splits the beams into at least two reflected and two transmitted beams, thereby reducing by half the number of optical filters, collimating lenses and enclosure units. Thus, for example, the same six-port filtering package can be used in the multiplexing and de-multiplexing operations of a DWDM module incorporating concatenated six-port packages. A typical DWDM module includes from two to eight six-port packages. In this case, the number of filter chips, collimating lenses, and fiber ferrules will be reduced by one-half compared to using three port packages.

The manufacturing method and optical element assembly of the present invention, therefore, provides an improved performance optical assembly utilizing a unique input ferrule, filter holder, and an assembly method for providing a low cost, highly reliable, and improved performance optical element assembly, such as a three-port collimating filter or six-port collimating filter assemblies, and using these assemblies in DWDM modules which can be used in an optical communications system.

The devices of the instant invention are applicable for both single mode optical fibers that are applicable to DWDM operations and for polarization maintaining fibers that can be used in the crystal based isolators, circulators, polarization splitters, and the like.

Additional features and advantages of the invention will be set forth in the detailed description which follows and will be apparent to those skilled in the art from the description or recognized by practicing the invention as described in the description which follows together with the claims and appended drawings.

It is to be understood that the foregoing description is exemplary of the invention only and is intended to provide an overview for the understanding of the nature and character of the invention as it is defined by the claims. The accompanying drawings are included to provide a further understanding of the invention and are incorporated and constitute part of this specification. The drawings illustrate various features and embodiments of the invention which, together with their description serve to explain the principals and operation of the invention.

BRIEF DESCRIPTION OF THE DRAWINGS

FIG. 14A is a view of an alignment washer;

FIG. 14B is a cross-sectional exploded view of a fiber-ferrule assembly using alignment washers;

FIG. 15 is an exemplary table for matching optical fiber SD and filter AOI.

FIG. 16F is an alternate schematic diagram of a six-port filter package coupled to waste energy terminals;

FIG. 16G is a schematic diagram of a six-port add/drop package;

DETAILED DESCRIPTION OF THE PREFERRED EMBODIMENT

Figure 1:
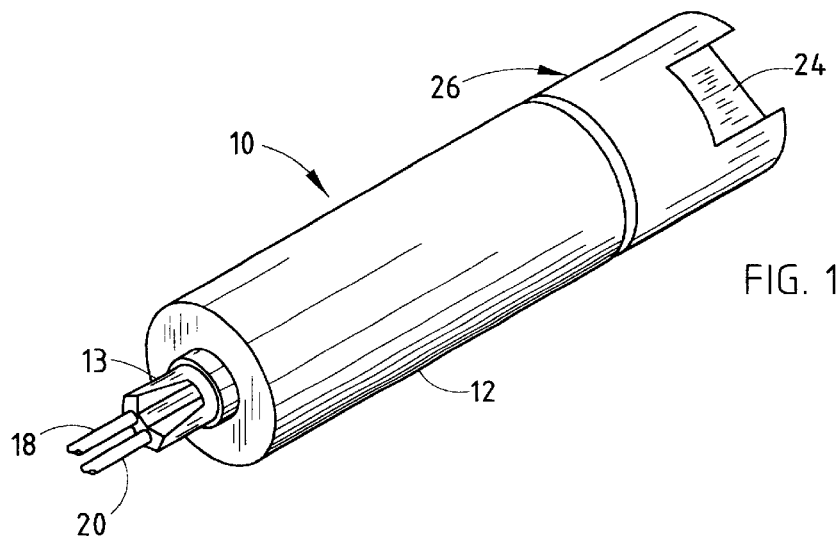
FIG. 1 is a perspective view of a filter subassembly embodying the present invention.
Figure 2:
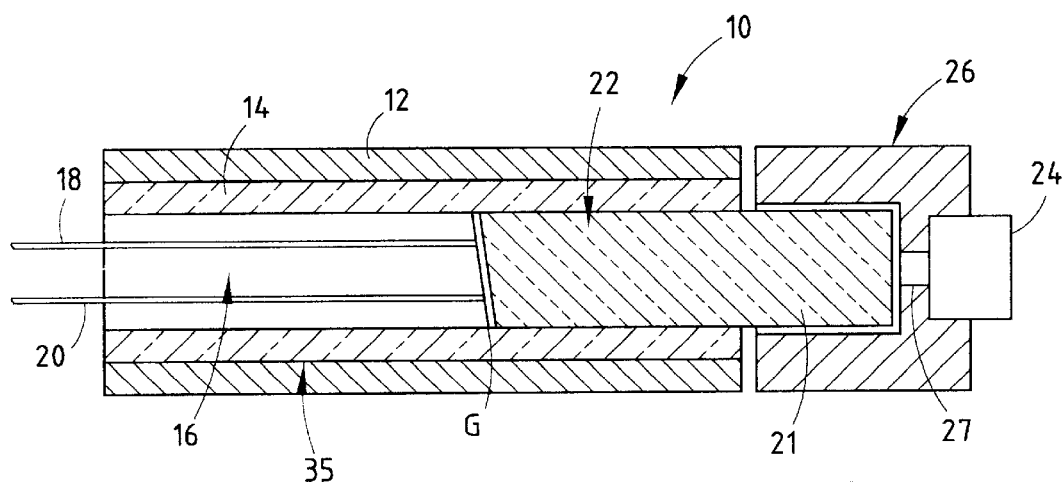
FIG. 2 is a partial vertical cross-sectional schematic view of the subassembly shown in FIG. 1.
Figure 3:
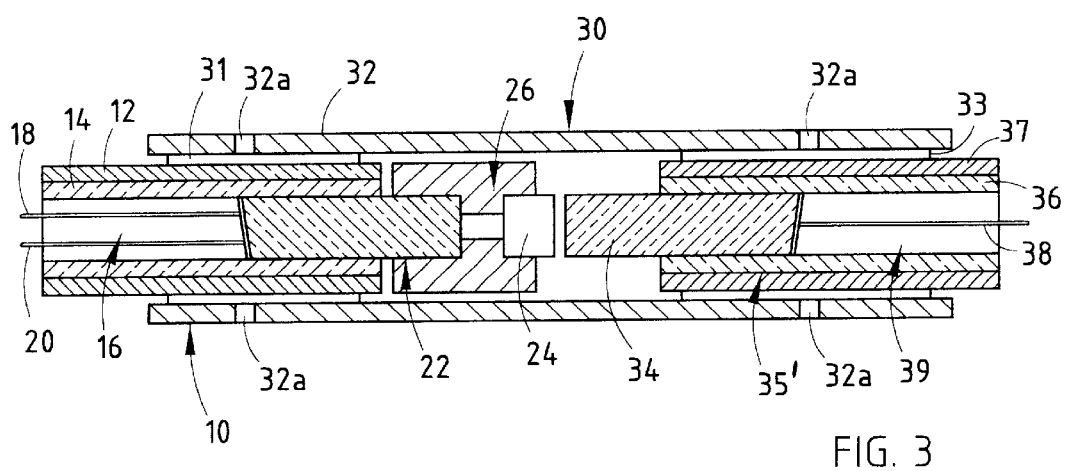
FIG. 3 is a vertical cross-sectional schematic view of a three-port filter assembly embodying the present invention.

Referring initially to FIGS. 1 and 2, a brief description of an optical element (e.g., filter) subassembly 10 is first presented. The invention is described and illustrated using an exemplary three-port filter device, however, the invention also applies to multiple-port devices such as six-port devices. For multiple-port devices, the number and position of fibers in ferrule 16 changes accordingly. The dual fiber collimating and filtering subassembly 10 includes an outer cylindrical metal housing 12, which is bonded at 13 (FIG. 1) around input and reflection optical fibers 18 and 20, respectively. Housing 12 surrounds an insulating cylindrical borosilicate or fused silica sleeve 14 (FIG. 2) within which there is mounted a dual capillary glass ferrule 16 receiving an input optical fiber 18 and a reflective optical fiber 20. The ends of fibers 18 and 20 in ferrule 16 face a collimating lens 22, such as, for example, a GRIN lens, which has polished facets on the input end, and (as seen in FIG. 2) which face and align with the ends of optical fibers 18 and 20 held in place by ferrule 16. Lens 22 collimates light from input fiber 18 into parallel rays, transmitting them to an optical element which may be a thin film filter 24, a birefringent crystal, or other appropriate optical element. The end of the collimating lens 22 that is closest to the filter 24 is referred to as the output end of collimating lens 22. A filter holder 26 is mounted to the end 21 of the collimating lens 22 according to the method of the present invention and includes an axial aperture 27 allowing light from lens 22 to impinge upon filter 24 and the reflective light to be directed to reflective optical fiber 20. Filter holder 26 also secures filter or crystal 24 in alignment with the collimating lens 22 with aperture 27 extending between the filter 24 and lens 22. The fiber-ferrule 16, lens 22, and insulating sleeve 14 are collectively referred to as an input collimating assembly 35. Collimating assembly 35 may also include cylindrical metal housing 12. A similar single fiber collimating assembly structure is collectively referred to as an output collimating assembly 35' and is shown in FIG. 3.

Before describing the manufacture of the subassembly 10 forming a part of an overall three-port filter, a three-port filter 30 is briefly described. FIG. 3 is also representative of a multiple-port device, however, for a multiple-port device, the number and position of fibers in ferrules 16 and 39 changes accordingly. As shown in FIG. 3, three-port filter 30 includes an outer cylindrical metal sleeve 32 into which subassembly 10 is mounted and secured by a cylindrical interface of solder and/or welding material 31 applied to the solder joint as seen in the schematic diagram of FIG. 3. Solder and/or weld material 31 may be applied through suitable apertures 32A in metal sleeve 32. The output signal from filter 24 is received by an aligned collimating output lens 34 similarly secured within a boro-silicate or fused silica glass sleeve 36 surrounded by a metal sleeve 37 which, in turn, is mounted within the interior of outer protective sleeve 32 utilizing a cylindrical solder interface 33. The output lens 34, ferrule 39, glass sleeve 36, and metal sleeve 37 form the output collimating assembly 35'. An output optical fiber 38 couples to the desired wavelength output signal from three-port filter 30 to the communication link in which the three-port filter 30 is installed. Thus, for example, the three-port filter 30 may be employed to receive a plurality of wavelengths from input optical fiber 18, pass a single output wavelength to output fiber 38, and return the remaining signal wavelengths to reflective optical fiber 20. The method of assembling subassembly 10 and its structural elements are unique and described in detail below. Further, the specific method of aligning output collimating assembly 35' within sleeve 32 will also be described below.

Figure 4:
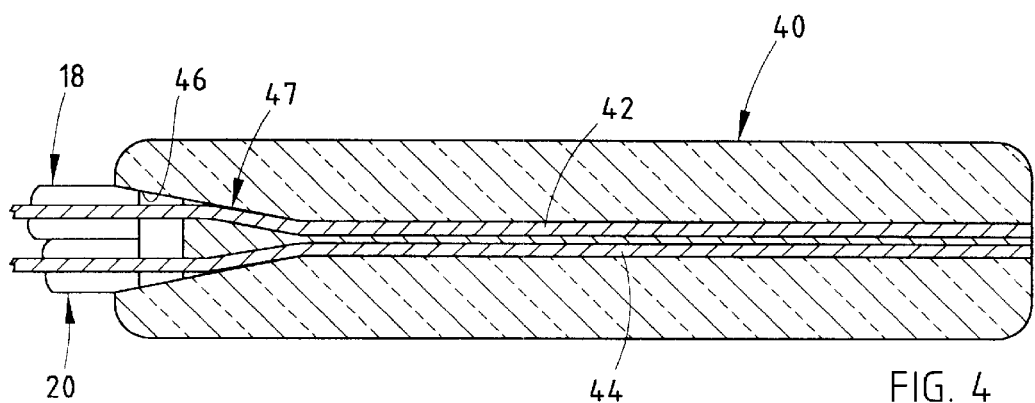
FIGS. 4 and 4A are an enlarged vertical cross-sectional and right end view, respectively, of a prior art ferrule employed in a prior art filter assembly.
Figure 4A:
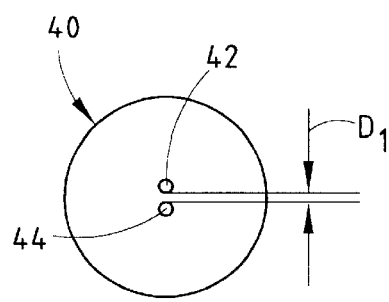

One problem associated with prior art ferrules is illustrated by FIG. 4 showing a vertical schematic cross-sectional view of a prior art input ferrule 40. Ferrule 40 is made of a conventional glass material such as fused silica or boro-silicate glass and includes a pair of spaced-apart capillaries 42 and 44 having a diameter sufficient to receive the stripped input and reflective optical fibers 18 and 20 having a diameter of about 125 µm. The overall diameter, however, of optical fibers 18 and 20 includes a protective polymeric sheath and is approximately 250 µm. Optical fibers 18 and 20 are cemented within the conical input section 46 of the prior art ferrule 40 utilizing a thermally curable epoxy adhesive providing a strain-relief connection of the coated fibers 18 and 20 within the glass ferrule. As the stripped optical fibers 18 and 20 exit the polymeric sheath and enter the capillary tubes 42 and 44 over the length of 1.2 mm of the conical input section 46, they are bent at area 47 schematically shown in FIG. 4. This S-bending of the optical fibers interconnection to the ferrule 40 results in deflection of the fiber, which exceeds 50% of the fiber diameter. This induced micro bending of the fiber increases insertion loss of the signals applied to the lens 22 due to the geometry of ferrule 40. Capillaries 42 and 44 of ferrule 40 are spaced apart a distance "D1", as shown in FIG. 4A that with the coned length provided by prior art ferrules as shown in FIG. 4, results in such excessive micro-bending of the optical fibers and resultant insertion losses. The alternate ferrule construction in which a single elliptical capillary is provided for receiving adjacent optical fibers and having a similar input cone construction suffers even more from the bending problem. In order to greatly reduce the insertion loss due to the undesirable S-bending of input fibers, an improved ferrule 16 of the present invention, which forms part of the subassembly 10 as seen in FIGS. 1 and 2, is employed and is described in FIGS. 5 and 5A.

Figure 5:
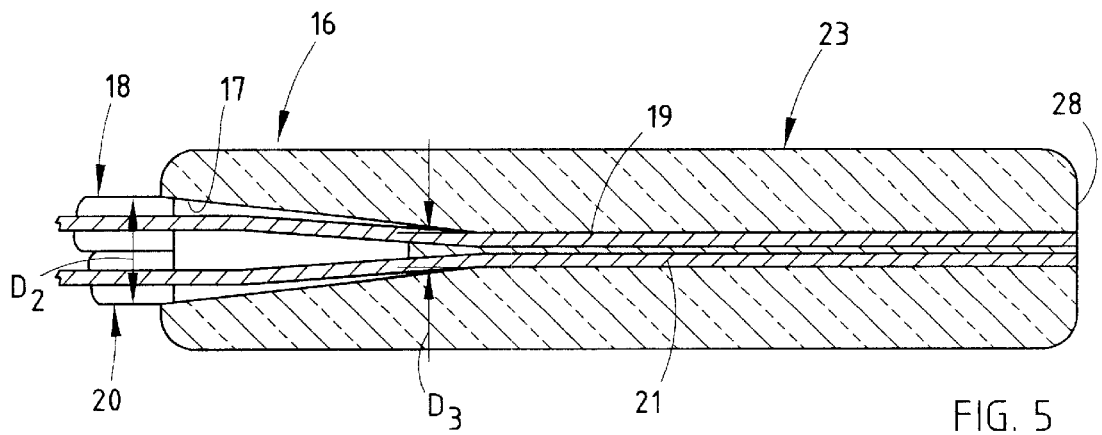
FIGS. 5 and 5A are an enlarged vertical cross-sectional view and right end view, respectively, of a ferrule employed in the filter subassembly of FIGS. 1 and 2 and the filter of FIG. 3.
Figure 5A:
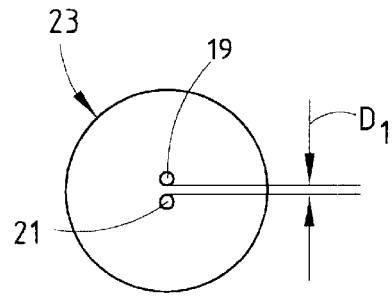

In FIG. 5, a ferrule 16 is shown which has an input cone 17 with an axial length in the preferred embodiment in excess of 2 mm and preferably 2.4 mm or approximately twice the length of prior art input cones. The input diameter "D2" of input cone 17 is approximately 0.8 mm to accommodate the 500 mm combined diameter of input fibers 18 and reflective fiber 20 and allow room for epoxy to bond the fibers within cone 17. The exit diameter "D3" of cone 17 adjacent capillaries 19 and 21, which receive and secure the optical fibers 18 and 20 therein, is preferably determined as:

$$D3 = 2f_d + D1$$

or $$D3 = 250 \ \mu m + D1$$

where $f_d$ is the fiber diameter with the sheath material removed

This accommodates any spacing D1 between the fibers and the 125 µm diameters of each of the stripped input and reflective fibers, allowing also approximately a one µm gap at the input to capillary tubes 19 and 21 for epoxy to securely seat the input and reflective fibers within ferrule 16. To obtain the best possible performance, the fibers should be selected for their geometric properties. Three important properties and the preferred tolerances are outer cladding diameter of 125 µm+/−0.2 µm, non-circularity of the cladding less than 0.2%, and core to cladding concentricity is less than 0.2 µm. By expanding the axial length "L" of cone 17 to nearly twice that of prior art input ferrules, S-bending is substantially avoided, providing substantially a nearly equal optical path length for both the input and reflective fibers and reducing insertion losses. This technique is also applicable to ferrules having more than two optical fibers and to ferrules with single or multiple capillaries.

The fibers are epoxied within the ferrule 16 with an epoxy adhesive such as, for example, 353 ND EPO-TEK epoxy adhesive available from Epoxy Technology, Billerica, Mass., and cured at about 110° C. for one and one-half hours. It is preferable to post-cure the assembly at 125–130° C. for one-half hour to reduce moisture absorption. The end-face 28 of the ferrule with inserted and bonded optical fibers is ground and polished to produce approximately 8° angle elliptical facet to the axis of the ferrule. Ferrule 16 is then cemented within the surrounding thermally insulating glass sleeve 14 (FIG. 2) to form input collimating assembly 35. Prior to the insertion of the ferrule 16 into sleeve 14, the lens 22 has been installed and cemented in place. The ferrule is aligned with a gap "G" (FIG. 2) of about 1 to 1.5 µm between the ends of the lens 22 and the ferrule to allow the axial and rotational active alignment of the ferrule to the lens 22 by rotating the ferrule within sleeve 14 and axially positioning it to accommodate the surface angle of the lens 22, which may run between 7.8° to 8.1°. For a three-port assembly, a signal is applied to the input fiber 18 while monitoring the output of the GRIN lens within sleeve 14. For a multiple-port assembly, such as used in a six-port device, the alignment process is similar; however, signals are applied to each of the input fibers and the ferrule is axially and rotationally positioned to optimize the alignment for all of the signals. This assures the minimum insertion loss and maximum signal coupling between the optical fibers and the input collimating lens 22, which subsequently receives the filter holder and filter therein as now described in connection with FIG. 6.

Figure 6:
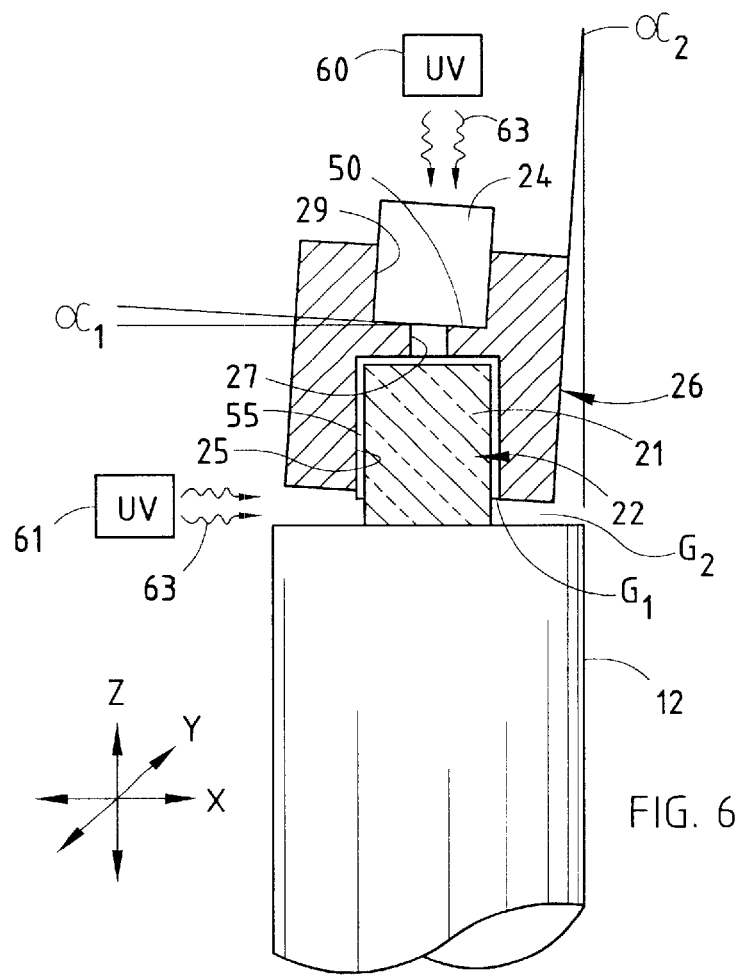
FIG. 6 is an enlarged vertical cross-sectional schematic view of an improved filter holder of the present invention also illustrating its method of assembly.

Referring now to FIG. 6, the subsequent positioning of filter 24 and filter holder 26 onto end 21 of the lens 22 is described. Matching the AOI of the filter 24 with the separation distance (SD) of the fibers 18 and 20 is important. A filter 24 with a desired AOI is selected for use in the assembly 10. An input collimating assembly 10 is selected having a ferrule 16 which has an SD that corresponds to the AOI of filter 24. The SD is accurately measured, preferably within 0.5 µm, and the filter holder 26 is mounted on the selected input collimator assembly 35. The matching process in the case of the four-fiber ferrule, used in six-port devices, is preferably performed as follows. The SD of one of the pairs of fibers is matched to the filter AOI. The alignment match for the second pair of fibers is provided automatically when the structural tolerances described above for the capillaries and fibers have been satisfied. Therefore, it is important for the SD for each pair of fibers to be approximately equal. Preferably the SD tolerance for each pair of fibers is within 0.5 µm. The tolerances are further discussed below in discussion of FIGS. 14 and 15.

Filter holder 26 has a cylindrical aperture 25 at its lower end, as seen in FIG. 6, which overlies the cylindrical diameter of lens 22. The diameter of the aperture 25 is large enough to provide a gap "G1" of about 50 µm surrounding output end 21 of collimating lens 22. This, as described below, allows the micro-tilting of the filter holder 26 with respect to lens 22 for precisely aligning the filter 24 and lens 22 while accommodating the bonding adhesive employed for securing the filter holder to the lens 22. Holder 26 is made of a material which has a coefficient of thermal expansion which is close to that of the lens and, in a preferred embodiment of the invention, is a unit made of SS17-4-PH stainless steel. Prior to assembling of filter holder 26 to lens 22, the filter 24 is mounted within the filter holder 26, which has a cylindrical aperture 29 with a seat 50 canted at an angle $\alpha_1$ (FIG. 6) of approximately 1.5° to 2° and preferably about 1.8° to accommodate the approximate 0.3° to 0.7° angular discrepancy between the front and rear surfaces of a typical filter chip 24. The cant of seat 50 also has the favorable effect of reducing the tilt angle of holder 26 relative to lens 22. The filter 24 is secured within cylindrical aperture 29 utilizing conventional epoxy or even silicone bonding adhesives, such as DC577 or CV3 2000, and the filter chip 24 can be any commercially available thin-film filter. In the illustrated embodiment, a commercially available filter having dimension of, for example, 1.4 by 1.4 by 1.5 mm is used. Such filters are available commercially from Corning Incorporated. The assembly and met hods of the invention can also be used with other optical devices in place of filter 24, such as various crystal-based components.

With filter 24 in place in filter holder 26, the holder is clamped in a vertically (as seen in FIG. 6) movable clamp which can also be rotated such that filter holder 26 can be moved into and out of engagement with lens 22 as well as rotated and tilted for actively aligning the optical axis of the filter to the lateral surface of the lens 22 to minimize insertion loss. Active alignment is the process of aligning the optical elements while applying input light signals to the device and monitoring an output signal. This is in contrast to passive alignment which is the process of aligning optical elements in the absence of a light signal.

The active alignment in an embodiment of the invention is achieved, for example, by applying a signal at about 1530 nm to input fiber 18 (FIGS. 1–3) while monitoring the reflected signal on fiber 20. Filter holder 26 is then micro-tilted in orthogonal directions and also rotated in increments of about 2° to 5° as necessary to achieve minimum insertion loss as determined by monitoring the input and reflected signals. There are six degrees of freedom in which the holder 26 may be moved relative to lens 22. These include micro-tilting on the XZ plane and YZ plane of FIG. 6, rotating about the Z axis, moving lateral along the X and Y axis, and raising and lowering the holder along the Z axis. Generally, only rotation and micro tilting along the XZ and YZ plane are sufficient to align the elements.

The preferred embodiment uses an automated iterative process in which the IL for each pair of fibers is monitored for each tilt or rotation. The iterative process repetitively adjusts the filter holder and monitors the input and output signals and eventually locates an optimum alignment as defined by predetermined tolerances. The alignment process increases in complexity with increasing pairs of optical fibers in multiple-port systems. The preferred method of alignment comprises the steps of aligning each pair of fibers separately and then selecting an average alignment position or a median position. For six-port devices, the optimum alignment achieved for the first pair of the reflective and input fibers can be slightly lowered when aligning the second pair of the reflective and input fibers. Also, in the case of six-port devices, the iterative process has been found to be unexpectedly short (i.e. few iterations) because of the tolerances selected in accordance with an embodiment of the invention. When a first pair of fibers is optically aligned, the second pair of fibers may be close to alignment since the second pair of fibers have virtually the same separation distance as the first pair of fibers.

During this alignment process, lens 22 and its sleeve 12 are mounted in an XYZ micro-adjustable stage of conventional construction to hold the projecting end of lens 22 in cavity 25 of holder 26. Once the optimum angular position of the filter holder 26 to lens 22 is determined, the filter holder 26 is raised axially away from the lens (while maintaining the angular relationship) to allow access to the side wall of lens 22. While separated, preferably four or more drops of bonding adhesive are positioned on the outer peripheral circumferential surface of the end 21 of lens 22, with care being taken not to touch drops of the epoxy adhesive to the lens end face surface. The filter holder 26 is then lowered over the lens 22, wiping the adhesive in the annular space between cavity 25 and lens 22. Next, the XZ axis of the stage may be further adjusted while monitoring signals applied to the input and reflective optical fibers 18 and 20 to assure a minimum insertion loss. Similarly, the YZ axis of the stage may also be adjusted while monitoring the signals to assure proper alignment and a minimum reflected insertion loss of no greater than about 0.3 dB. A variety of UV and thermally curable epoxies were tested, and it was determined that the bonding adhesive which worked unexpectedly well was commercially available EMI-3410, which is a UV and thermally curable filled adhesive available from Electronic Materials, Inc., of Breckenridge, Colo.

By providing a gap of approximately 50 µm between the inner surface of cylindrical aperture 25 of filter holder 26 and the outer diameter of lens 22, the optical axis of the lens can be precisely aligned with the optical axis of filter 24. Filter holder 26 is adjustable within an angle $\alpha_2$ of less than about 1.0°, as shown in FIG. 6. This active alignment of the lens 22 and filter holder 26 is achieved by the movement of the lens 22 in the XZ and YZ planes, as shown in FIG. 6, utilizing a standard micro-stage (i.e., micropositioner). In one embodiment of the invention, one or more sources of ultra violet radiation such as sources 60 and 61 are employed to expose the bonding adhesive at the interface between holder 26 and lens 22 to ultraviolet radiation to cure the bonding adhesive sufficiently such that the desired relationship between the lens 22 and filter 24 is fixed until the adhesive is finally thermally cured.

Figure 7:
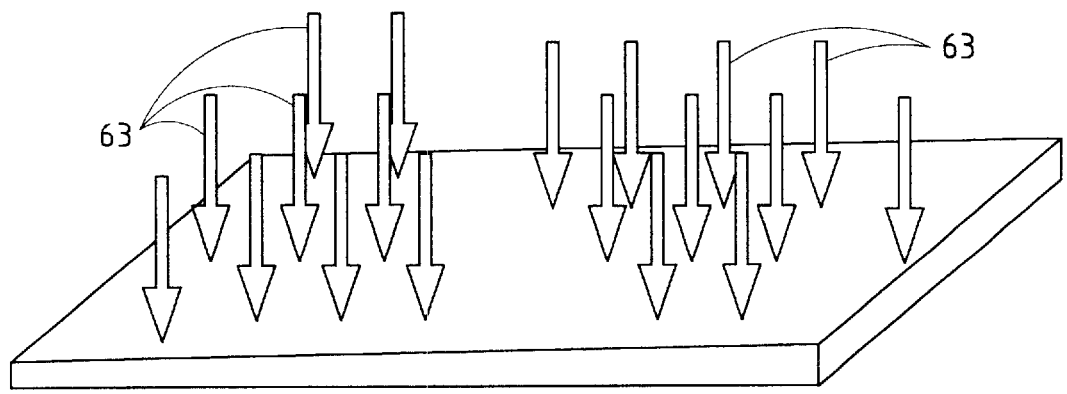
FIG. 7 is a schematic view illustrating the frontal polymerization of a UV or thermally curable bonding adhesive when UV light is propagated transversely through a filter, as illustrated in FIG. 6.

As seen by the diagram of FIG. 7, by injecting ultra violet radiation from source 60 into the exposed end of filter 24, ultra violet radiation (indicated as 63) is dispersed as the UV radiation propagates transversely through the filter and into the adhesive layer 55 (FIG. 6), causing frontal polymerization of the adhesive due to UV light propagating through the filter. In most instances, the UV radiation 63 from source 60 through filter 24 will, upon an exposure of about 20 seconds at a distance of about 2.5 cm between the source and the filter 24 result in sufficient UV curing of the adhesive to fix the filter holder to the lens 22. In addition to exposing the adhesive 55 through filter 24 utilizing a UV light source 60, an additional UV light source 61 can be employed to direct UV radiation 63 through the gap G2 between the lower annular end of filter holder 26 and the top annular surface of sleeve 12 with 40 second exposures for a total exposure of about 100 seconds of UV radiation to cure the adhesive in the annular area of gap G1 at the lower end of filter holder 26. After the UV curing, which tends to temporarily induce stresses typically of from 200 to 300 psi or higher in the subassembly, thermal cure stress release and curing is provided as described below. Before such curing, however, input and output signals are monitored to assure that the reflected insertion loss (IL) remains less than about 0.3 dB and thermal change in IL is below about 0.05 dB. The UV from light source 61 can be rotated around the periphery of the subassembly during successive exposures. The UV light can be delivered also through slots or openings formed into the lateral sides of the filter holder 22 as described below.

Figure 8:
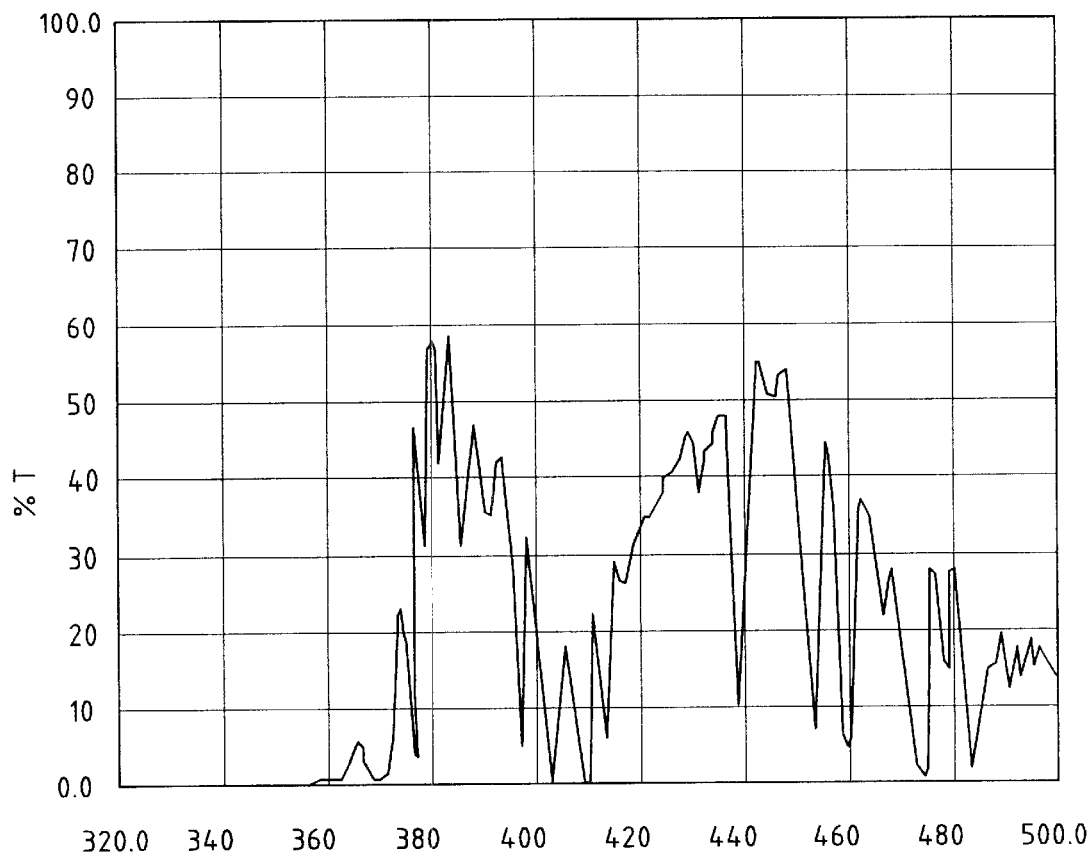
FIG. 8 illustrates the spectrum of a mercury light source showing a significant portion of the UV light spectrum.
Figure 9:
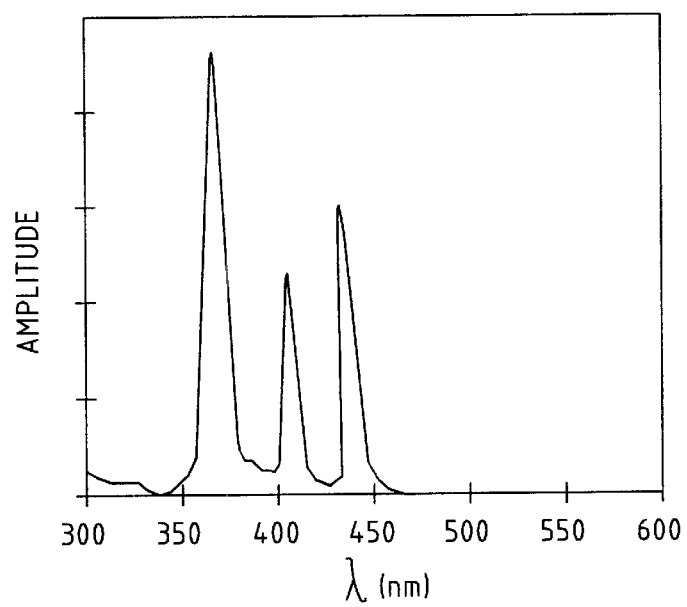
FIG. 9 is the measured UV-transmission spectrum of a commercially available thin film filter used in the structure shown in FIGS. 1, 2, 3, and 6.

The UV sources 60 and 61 have spectral emissions, as illustrated in FIG. 8, which shows the spectrum of a mercury light source. FIG. 9 illustrates the experimentally determined UV transmission spectrum of such a light source through a bulk filter chip of the kind used in the filter 24 illustrated in FIG. 6. The convolution of these spectra indicates that a sufficient portion of the UV light spectrum propagates to the bond layer through the filter 24 and that the duration of the UV cure cycle results in a nearly zero change of insertion loss over a period from 630 to 700 seconds. The UV initiated cure induces initial stresses due to polymerization shrinkage. For a typically highly filled epoxy adhesive with a limited volume of shrinkage (on the order of 0.2%), the induced stress can be as high as 300 to 600 psi. The stresses induced by the UV curing, which fixes the alignment of the filter to the collimating lens 22, are relieved and the bonding adhesive 55 further cured during thermal curing of the subassembly 10 in a conventional oven which is controlled to provide the stress relaxation and thermal cure cycles as illustrated in FIG. 10.

Figure 10:
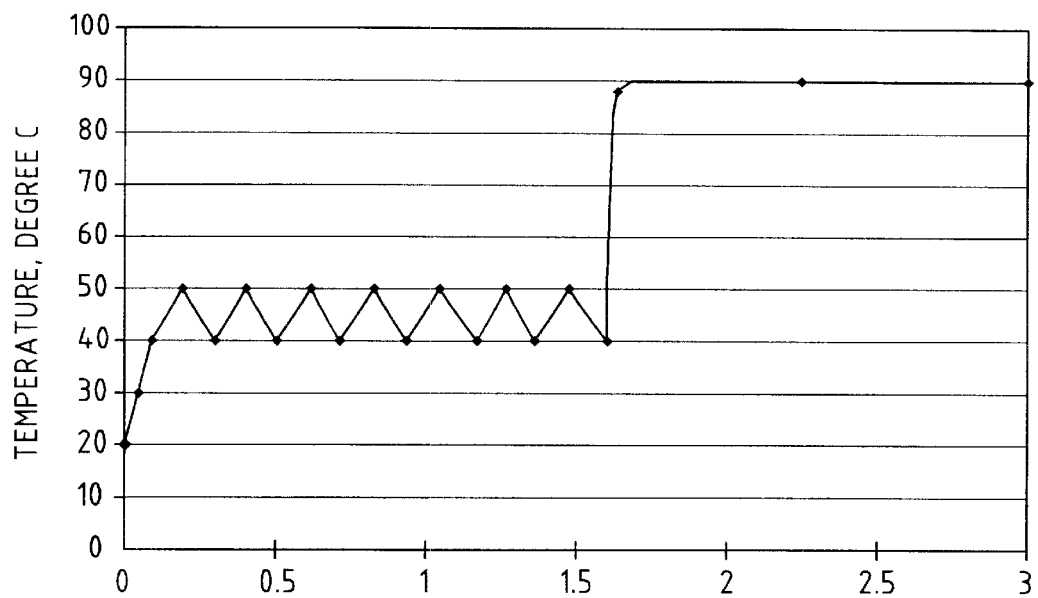
FIG. 10 is a graph of the accelerated dark cure and thermal cure of the subassembly shown in FIG. 6.

The graph of FIG. 10 illustrates an accelerated and thermally assisted stress relaxation phase in an oven which is controlled to provide several short thermal cycles at an elevated temperature preferably not exceeding 50% of the minimum temperature of thermal cure. The cycle typically starts at room temperature, and the temperature is increased to cycle between about 40° and about 60° C. over ten to fifteen cycles per hour for a total period of approximately one and one-half to four hours. The thermal cycling induces the variable mismatch stresses in the glass, metal filter holder, and the adhesive. Although the rate of stress relaxation in the adhesive increases with an increase in the mismatch stresses, this stress level is limited by the allowable elastic limits. These cyclic changes in temperature induce the creep in adhesive that leads to the additionally accelerated stress relaxation. By cycling the temperature as shown in FIG. 10, the typically 12 to 24 hour room temperature dark cure is reduced to about one to two hours. In this case, any thermally induced repositioning of optical components (e.g. filters) is drastically reduced.

As seen in FIG. 10 after the thermally assisted stress relaxation phase (TASR), the assembly is subjected to a final thermal cure for about two to about two and one-half hours at a temperature of from about 85° to about 100° in the case of the preferred EMI-3410 adhesive. By utilizing the thermal curing cycle illustrated in FIG. 10, the elevated temperature induces a thermal mismatch stress in addition to the existing shrinkage stresses. When the combined stresses are less than the isochronous elastic limit of the adhesive material, the accelerated stress relaxation occurs with no irreversible deformation in the bond. This effect is substantially improved with increasing the number of thermal cycles during the TASR phase (i.e., initial) portion of the thermal cure cycle.

Figure 11:
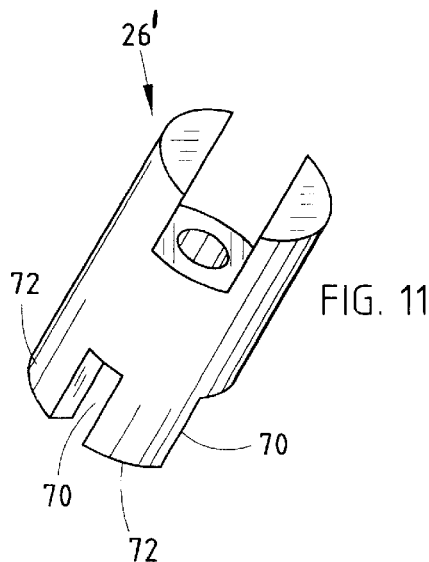
FIG. 11 is a perspective view of an alternative embodiment of a filter holder embodying one aspect of the present invention.
Figure 12:
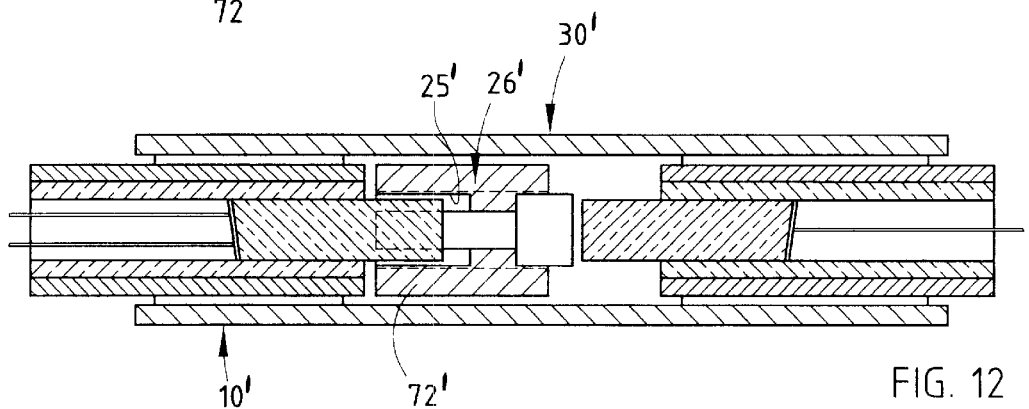
FIG. 12 is a vertical cross-sectional schematic view of a three-port filter employing the filter holder shown in FIG. 11.

Although the utilization of the UV light source 60 directing radiation 63 through filter 24 provides the desired initial UV curing of the adhesive bond between the filter holder and collimating lens, the filter holder can be modified, as seen in FIGS. 11 and 12, to provide additional axial exposure ports for exposure by UV radiation from radial source 61 (as seen in FIG. 6) to improve the dispersion of UV radiation through the glass bonding adhesive layer 55.

As shown in FIG. 11, a filter holder 26' is shown, which is substantially identical to filter holder 26 with respect to the provision of a cylindrical gap by its lower cylindrical aperture 25' for adjustment of the filter holder to the lens; however, the lower end of filter holder 26' includes a plurality of apertures such as longitudinally extending, radially inwardly projecting slots 70 spaced around the periphery of the filter holder and communicating with cylindrical opening 25' within the filter holder 26'. Four to six slots 70 have been found acceptable. Once a filter 24 is mounted in place as described above in connection with filter holder 26, holder 26' receives epoxy as in the previously described embodiment, and the lens is raised and adjusted with respect to filter 24 contained within filter holder 26' in the same manner as in the first embodiment. The light source 61, however, is moved around the periphery of the filter holder 26' directing UV radiation into slots 70 defining downwardly projecting, spaced apart legs 72 between such slots such that UV radiation is dithered into the cylindrical side walls of lens 22 which serves to further disperse the UV radiation uniformly within the annular space containing bonding adhesive 55. By providing spaced radially extending elongated slots 70 or other suitably shaped apertures extending through the side wall of the lower section of filter holder 26', a light path is provided for UV radiation to the inner cylindrical aperture 25' receiving the end of lens 22. In one embodiment, four slots 70 spaced at 90° intervals around the lower section of holder 26' were provided. This results in improved uniform UV exposure to facilitate the UV curing of adhesive 55. In this embodiment, it is unnecessary to expose the bonding adhesive utilizing a light source 60 through the filter since the bonding adhesive is uniformly exposed utilizing radiation from light source 61. Once the subassembly 10', as shown in FIG. 12, is completed, it is assembled into the resultant three-port filter package 30' in a conventional manner.

The above description is generally applicable to optical devices ranging from three-port devices to five-port devices, and to higher port devices. The difficulty of manufacturing operational devices increases with the increased number of optical fibers and ports. Discussed below are some of the features of the present invention which are directed to devices with five optical ports or more.

The uses and applications for five, six and higher port-count embodiments of the invention are many. For example, possible configurations of multiple-port thin-film filters, splitters, circulators and isolators include: six-port devices that are formed from two-fiber and four-fiber ferrule assemblies, eight-port devices that are formed from two four-fiber ferrule assemblies, and five-port devices that are formed from a single-fiber ferrule assembly and a four-fiber ferrule assembly.

One important aspect of a multiple-port device is the tolerance for the position of the optical fibers in the fiber ferrule 16. The core of an optical fiber has a diameter of only about 9.5 µm. Consequently, a 1 µm shift or error in the position of the fiber can cause the IL to be unacceptable. Therefore, great care must be taken to ensure the total tolerance in the positioning of the fibers. To achieve these tolerances, the fibers should be pre-selected to provide the core concentricity within a tolerance of preferably about 1.0 µm, and more preferably about 0.5 µm, and most preferably about 0.1 µm; cladding diameter of 125 µm within a tolerance of preferably about 1.0 µm, and more preferably about 0.5 µm, and most preferably about 0.1 µm; and the ovality tolerance of preferably less than about 0.8%, and more preferably about 0.4%, and most preferably about 0.12%. Concentricity is the deviation of the center of the optical fiber core from the center of the fiber. Ovality is defined as the difference between the largest and smallest diameter of the fiber divided by the average diameter of the fiber (i.e. (D1−D2)*2/(D1+D2) where D1 and D2 are the largest and smallest diameter of the fiber). The pre-screening and selection of the fibers for one or more of these characteristics have yielded the unexpected result of providing an assembly in which the fibers and other component parts can be assembled and aligned in a manner that can be reliably repeated and manufactured for commercial applications. Prior to the realization of this unexpected result, there were no commercially available optical packages having greater than three ports, and no commercially available six port packages. Regarding ferrule capillary tolerances, the simplest "square" capillary ferrule is preferably characterized by a tolerance of the output end of the capillary of 252 µm+/−2 µm as the distance between two parallel sides and more preferably 251 µm+/−1 µm and most preferably 250.5 µm+/−0.5 µm. Similar tolerances are preferred for the other capillary shapes and configurations. Further, the tolerance of the fiber position must be maintained throughout the manufacturing, packaging, and environmental conditions the device must endure. The methods and apparatus to achieve these tolerances are a subject of the present invention and are discussed below.

Although some prior art devices may initially achieve the desired tolerances for the position of optical fibers, the prior art often fails when the device is subject to stresses, strains and environmental conditions that cause the fibers to shift sufficiently to exceed the tolerances. Causes of these stresses include: 1) viscous flow of adhesive involving the fibers, 2) curing of the adhesives that bond the fibers to the ferrule, and 3) thermal stress due to the final packaging operations or environmental testing conditions. During manufacture, the devices are subject to heat such as from solder used to encase the devices in a protective metal sleeve 32. In use, the devices are subject to environmental conditions and must remain operational over a qualification temperature range from −40° C. to 85° C. (an industry standard temperature range). Therefore, one aspect of the invention relates to a four-fiber-ferrule that satisfies the above-mentioned tolerances.

Ferrules are generally cylindrical boro-silicate or fused silica components with one, two, three or more capillaries for receiving the optical fibers. Ferrules 16 were discussed above in discussion of FIGS. 2 and 3; however, the capillaries for six-port devices are preferably different. The shape of the drawn capillaries and the illustrative fabricating techniques allow fibers to be not only symmetrically separated from the central axis of the ferrule, but be properly guided and constrained as well. This minimizes the repositioning caused by the adhesive flow and the thermally induced change in the separation distance between two pairs of the input and reflective fibers. The capillaries provide precision parallel positioning inside the ferrule and bonding of the fibers and thereby provide a reliable constraint of the fibers. Preferably, the fibers touch the nearest adjacent fiber or have a gap between the fibers of not more than about 0.5 µm. This helps to fix the position of the fibers. It is also preferred that the fibers do not twist around each other over the first 10 to 15 mm before the fibers enter the ferrule to reduce stress and/or fiber repositioning. An illustrative assembly process includes the following steps. The fibers are stripped of the protective coating and cleaned for a length of about 5 cm of the fiber end. The fibers are dipped into adhesive (e.g., Epo-Tek 353 ND). The stripped fiber ends are then fed through the capillary until the fiber coatings just reach into the cone end portion of the ferrule. Additional adhesive is applied to the fibers if needed, and the adhesive is allowed to wick through the entire capillary. An adhesive such as 353 ND adhesive with viscosity (at room temperature) of about 3000 cPs (centipoise), or other suitable adhesive, can be used. The predicted gaps in the capillaries shown correspond to this viscosity. A higher viscosity adhesive (5000 to 10000 cPs) may be used if the gaps are slightly larger. An increase in temperature when inserting the fibers inside the capillaries decreases the viscosity of the adhesive. Thus, having various viscosities and temperatures, we can provide a better positioning of the fibers and minimize their repositioning after cure. In general, a suitable viscosity can be determined using the Hagen-Poiseuille equation modeling viscous flow in a capillary with optical fibers positioned in the capillary.

The assembly is cured, an 8-degree angle is polished into the ferrule and anti-reflective coating is applied. The bond layers between the fibers and surrounding ferrule are extremely thin (preferably less than about 1–1.5 µm) to minimize thermal stress and movement. Various embodiments of the ferrule capillaries of the present invention are illustrated in FIGS. 13A to 13H and 14A to 14E.

Figure 13A:
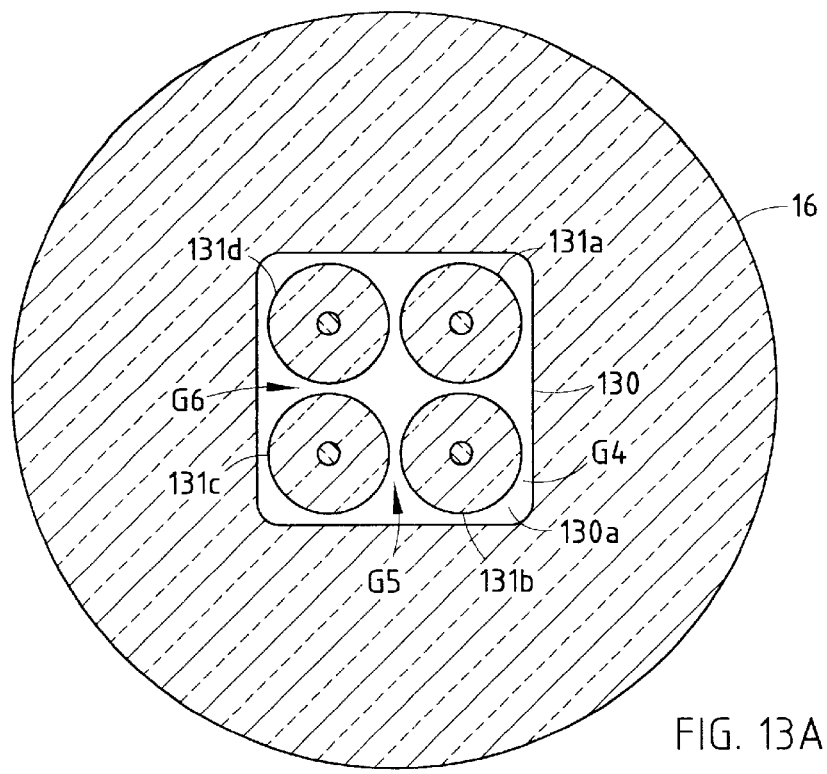
FIG. 13A is a cross-sectional view of a fiber-ferrule assembly illustrating a rounded square capillary.

FIG. 13A shows a cross sectional view of a ferrule 16 with a rounded square or rounded rectangular capillary 130 and closely packed optical fibers 131a, 131b, 131c, and 131d. The rounded square capillary provides a fixed SD, while the rounded rectangular capillary can make the SD variable. The rounded corner and closely packed fibers make this a good design for several reasons. The shape of the capillary along with the closely spaced fibers 131 effectively prevents movement of the fibers 131 prior to curing and also reduces thermal stress on the fibers after curing. The curvature of rounded corner 130a preferably has a smaller radius than the outer surface of fibers 131. More preferably, the corners 130a are 90-degree angles and thus form a true square or rectangle capillary. Therefore, for purposes of this specification, "substantially rectangular" refers to a capillary cross section where the radius of the corners is less than or equal to the radius of the enclosed optical fibers. Gap G4 is where the fiber comes closest to touching, or actually touches, the wall of capillary 130. Gap G4 is preferably less than about 0.5 µm, and more preferably less than about 0.1 µm, and most preferably zero (i.e., the fiber touching the wall of the capillary). The gap G6 between the closely adjacent fibers 131a and 131b (and also fibers 131c and 131d) is similarly small (i.e., preferably less than about 1.0 μm, 0.5 μm, or zero μm). The gap G5 is also preferably small (i.e., less than about 1.0 μm, 0.5 μm, or zero μm) however; the gap G5 between the distant adjacent fibers 131a and 131d may be larger to achieve a desired SD as illustrated in the following figures. The closely packed fibers also provide a secondary advantage in that only a small amount of adhesive is required in the capillary 130 and therefore less thermal stress is exerted on the fibers 131 due to the unequal coefficient of thermal expansion (CTE) between the fibers and the adhesive. Even the adhesive in the larger gap G5 has been found to have minimal effect in causing stress or shifting of the optical fibers due to thermal expansion and contraction. This capillary design tends to prevent shifting of the fibers and prevents rotation of the fibers due to the flow of adhesive prior to cure (e.g., fiber 131d is unlikely to rotate to the position of fiber 131a, and fiber 131a is unlikely to rotate to position 131b, etc.).

Once the fibers are affixed in the capillary 130, the selection of which optical fibers will form pairs (i.e., input and reflective) may be made. Generally, pairs of fibers will be positioned diagonally from one another. For example, referring to FIG. 13A, diagonally spaced fibers (e.g., 131a and 131c) may be selected for pairing. Light signals moving through diagonally spaced fibers may intersect at the same point at the center of the optical filter 24. This may cause some interference between signals. If signal interference is a problem, then using the capillary designs with both fixed and variable SD designs for the fiber pairs may reduce the interference. Several capillary configurations are possible and are discussed next.

Several other exemplary capillary designs include the dual-oval capillary (FIG. 13B), the clover-leaf or four-circular capillary (FIG. 13C), the six-fiber rectangular capillary (FIG. 13D), the two wafer-ferrule (FIGS. 13E and 13F), the four-fiber rectangular capillary (FIG. 13J), the dual rectangular capillary (FIG. 13K), the variable dual rectangle capillary (FIG. 13L), the dual oval capillary (FIG. 13M), the mixed capillary (FIG. 13N) and the alignment washer design (FIGS. 14A and B). For simplicity, the same reference numbers are used for corresponding features in each of the Figures.

A significant difference between the capillary designs is that some are useful for a "fixed" separation distance design while others are useful for a "variable" separation distance design. For example, FIGS. 13A through 13D illustrate fixed SD designs (i.e. the SD cannot be changed). However, FIGS. 13E through 13H illustrate variable SD designs. Generally, the variable SD designs are used when larger separation distances are desired.

Figure 13B:
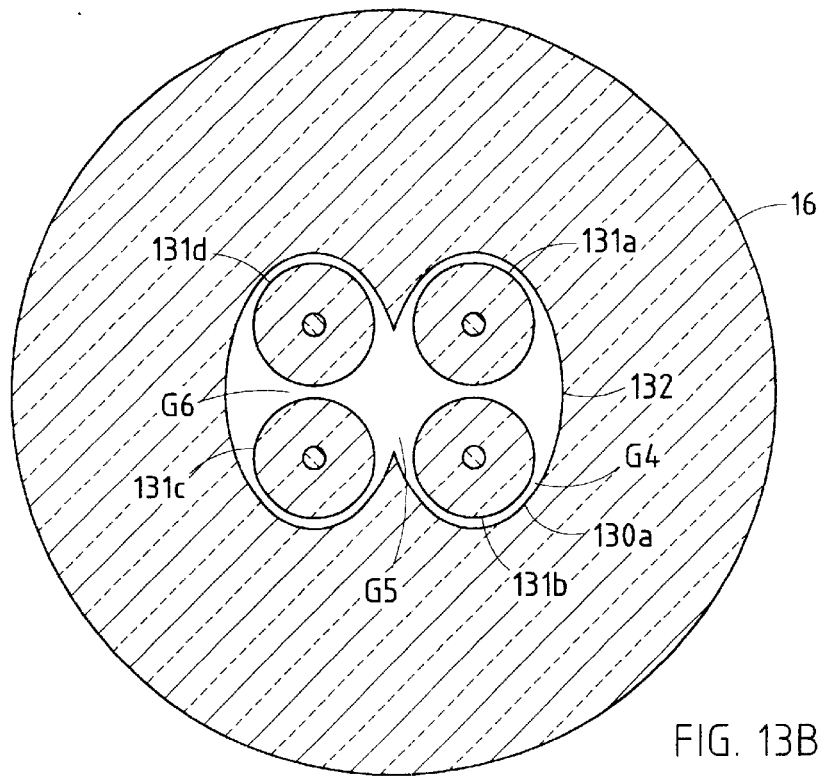
FIG. 13B is a cross-sectional view of a fiber-ferrule assembly illustrating a dual-oval capillary.

Referring now to FIG. 13B, the shape of dual-oval capillary 132 resembles two adjacent ovals and the capillary 132 encloses the optical fibers 131. Portions of capillary 132 form a constraining arc 132a of approximately 120° to 180° around fibers 131. The gap G4 between the surface of the fibers 131 and the proximate wall of the capillary 132 is preferably less than about 1.5 μm, and more preferably less then about 1.0 μm, and most preferably less than about 0.5 μm. Similarly, the gap between closely adjacent fibers G6 is also preferably less then about 1.5 μm, and more preferably less then 1.0 μm, and most preferably less then about 0.5 μm at the closest point. The gap G5 between the variably distant adjacent fibers G5 preferably ranges from 0.5 μm to about 300 μm depending on the position of the two oval capillaries. The diagonal pairs, such as fibers 131a and 131c, are formed into pairs of input and reflective optical fibers. The dual-oval capillary may be expanded to three or even four adjacent ovals if desired to form multi-oval capillaries. However, in the multi-oval capillaries, diagonal pairs of optical fibers are preferable.

Figure 13C:
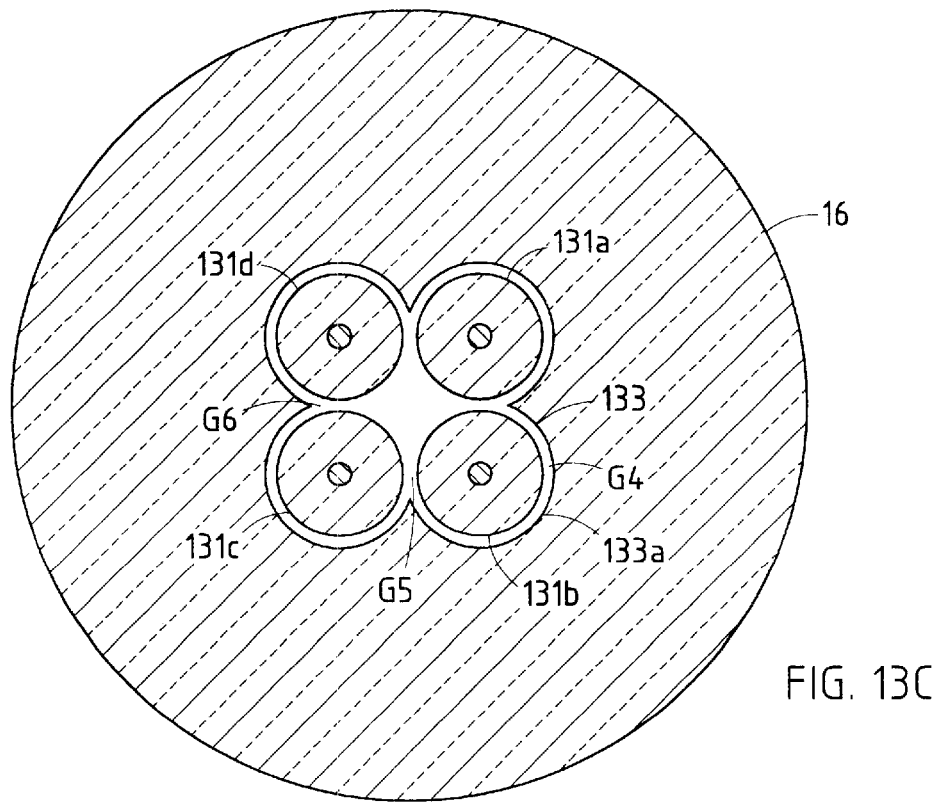
FIG. 13C is a cross-sectional view of a fiber-ferrule assembly illustrating a four-circular capillary.

FIG. 13C illustrates a four-circular capillary 133 enclosing fibers 131. Portions of capillary 133 form a constraining arc 133a of approximately 180° to 240° around fibers 131. The gap G4 between the fiber and the proximate wall of the capillary is preferably less than about 1.5 μm, and more preferably less then about 1.0 μm, and most preferably less than about 0.5 μm. Also, the gap G6 between closely adjacent fibers is similarly preferably less than about 1.5 μm, and more preferably less then about 1.0 μm, and most preferably less than about 0.5 μm.

Figure 13D:
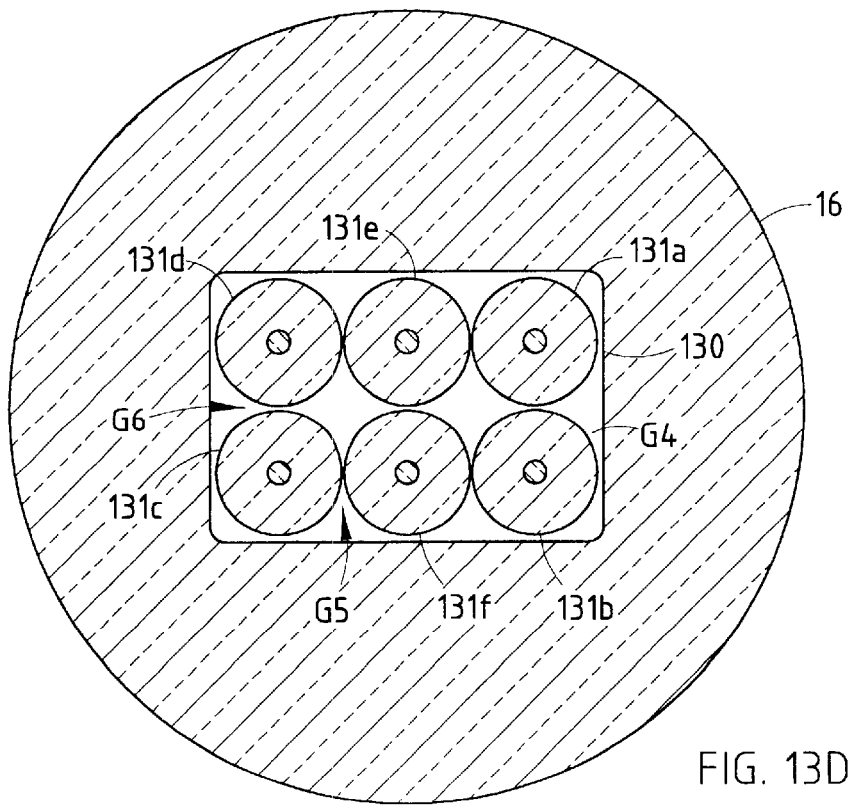
FIG. 13D is a cross-sectional view of a six-fiber ferrule having a rectangular capillary.

FIG. 13D illustrates a rectangular capillary 130 enclosing six fibers 131. Again, the gaps G4, G5, and G6 are preferably as small as possible to prevent movement of the fibers. The gaps are therefore preferably less than about 1.5 μm, and more preferably less then about 1.0 μm, and most preferably less than about 0.5 μm. In this embodiment the fibers have two separation distances. The diagonal fiber pairs (i.e. 131a, 131c and 131b,131d) have matching separation distance. However, the fiber pair, 131e and 131f, have a smaller separation distance. While this configuration may be of less use with thin film filter assemblies, this configuration is useful for certain crystal based assemblies such as isolators.

The ferrule and capillary designs described above are examples of fixed separation distance capillaries. The separation distance between the fibers is fixed and cannot be changed. However, it is desirable to be able to change or vary the separation distance. For example, if a thin film filter has a certain preferred angle of incidence, then it is useful to vary the separation distance of the fibers to correspond to the desired AOI. The following ferrule and capillary designs provide a method of achieving this desired separation distance while maintaining the same positioning accuracy of the prior designs. Generally, these designs maintain a fixed vertical separation between fibers while varying the horizontal (as seen in the Figures) distance. It has been found that the ability to vary the horizontal distance in a range of from 5 μm to 75 μm is most useful.

Figure 13E:
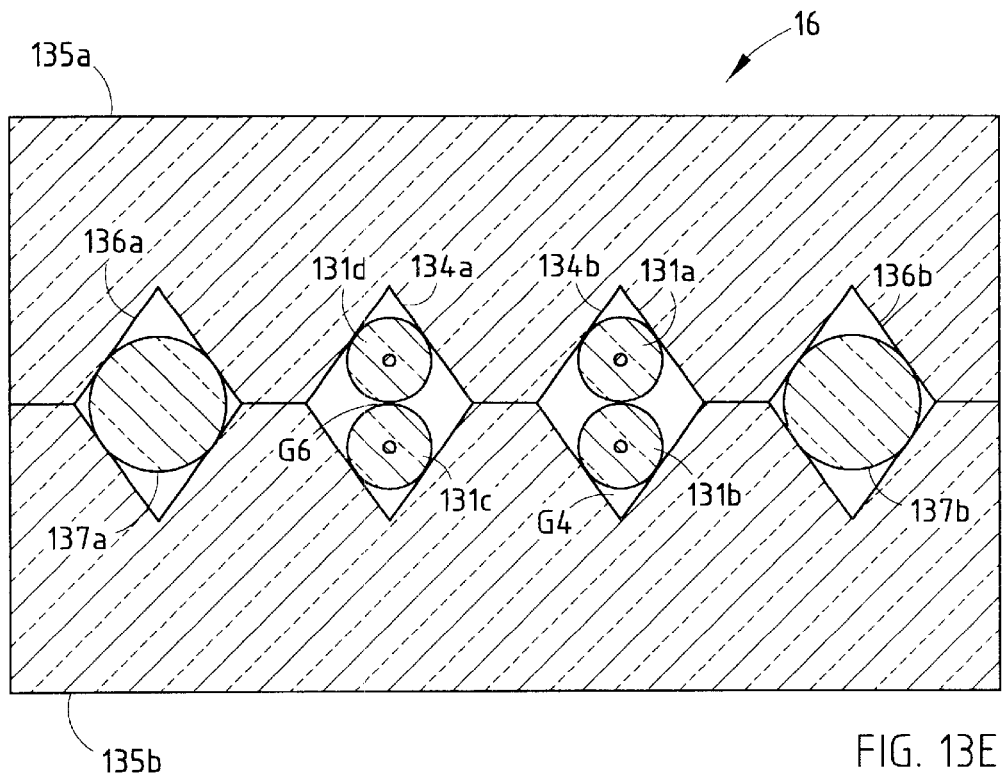
FIG. 13E is a cross-sectional view of a fiber-ferrule assembly illustrating capillaries formed by symmetrical grooves formed in dual silicon wafers.

One embodiment for a variable SD ferrule and capillary is illustrated in the two-wafer capillaries shown in FIG. 13E where a cross-sectional view of four fibers 131 (two pairs) are positioned inside of V-shaped capillaries 134a and 134b formed from matching grooves in two elongated silicon plates (wafers) 135a and 135b. The silicon wafers are etched with the V-grooves and accuracy of 0.5 μm is possible. Crystallographic orientation provides excellent angle reproducibility. Further, the wafers are easily mass produced using current etching techniques. The wafers 135 are each provided with four, preferably symmetrical, grooves. The two center grooves (i.e. fiber grooves) are used to form capillaries 134a and 134b when the wafers are mated together. A feature of this design is that the V-shaped grooves may be positioned as desired to achieve any required separation distance between the fibers 131. The adjacent fibers in each capillary 134 preferably touch each other. Adhesive is applied to the gaps to secure the fibers 131 in place. Alignment grooves in wafers form two alignment capillaries 136 which are for aligning the wafers 135. Preferably, glass balls or rods 137 of about 300 μm diameter are inserted into alignment capillaries 136 of having dimensions of suitable size to contain rods 137 up to about 302 μm in diameter to maintain alignment. The rods 137 preferably have dimensional tolerance of 2.0 μm, and more preferably have a tolerance of 1.0 μm, and most preferably have a tolerance of 0.5 μm. If the rods are too large, the fibers may have excess room to move relative to their respective grooves. The glass rods, therefore, are preferably pre-screened to verify dimensional tolerances. UV-curable tacking adhesives and thermally curable structural adhesives are applied for providing structural integrity of the assembly. A more preferable wafer ferrule is illustrated in FIGS. 13F through 13H.

Figure 13F:
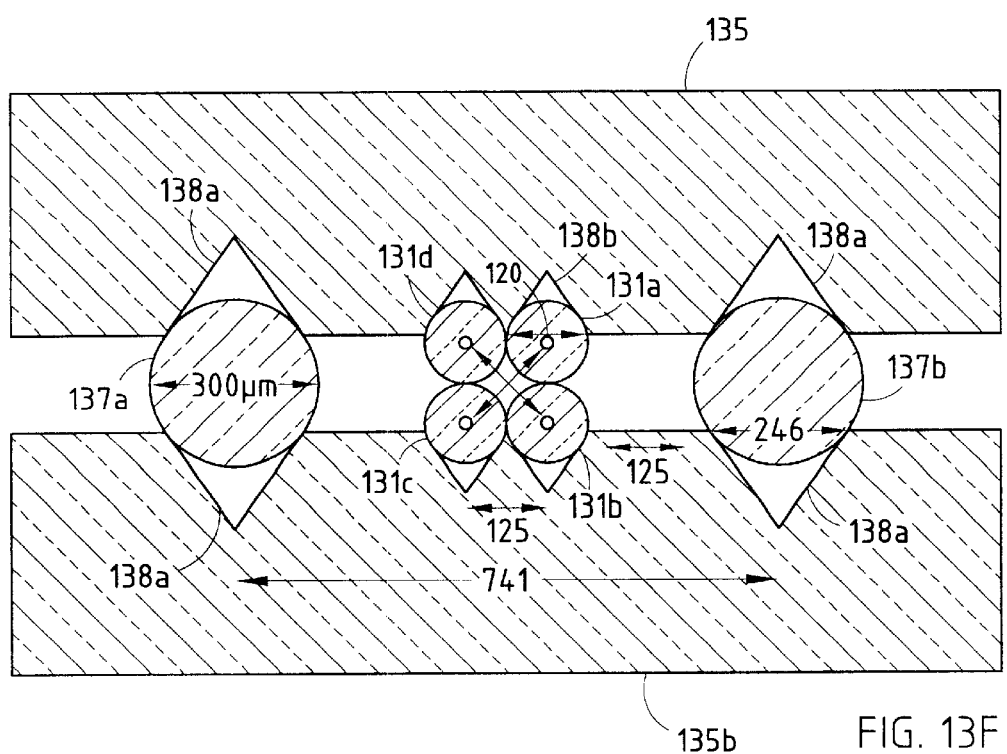
FIG. 13F is another embodiment of a fiber-ferrule formed from two wafers.
Figure 13G:
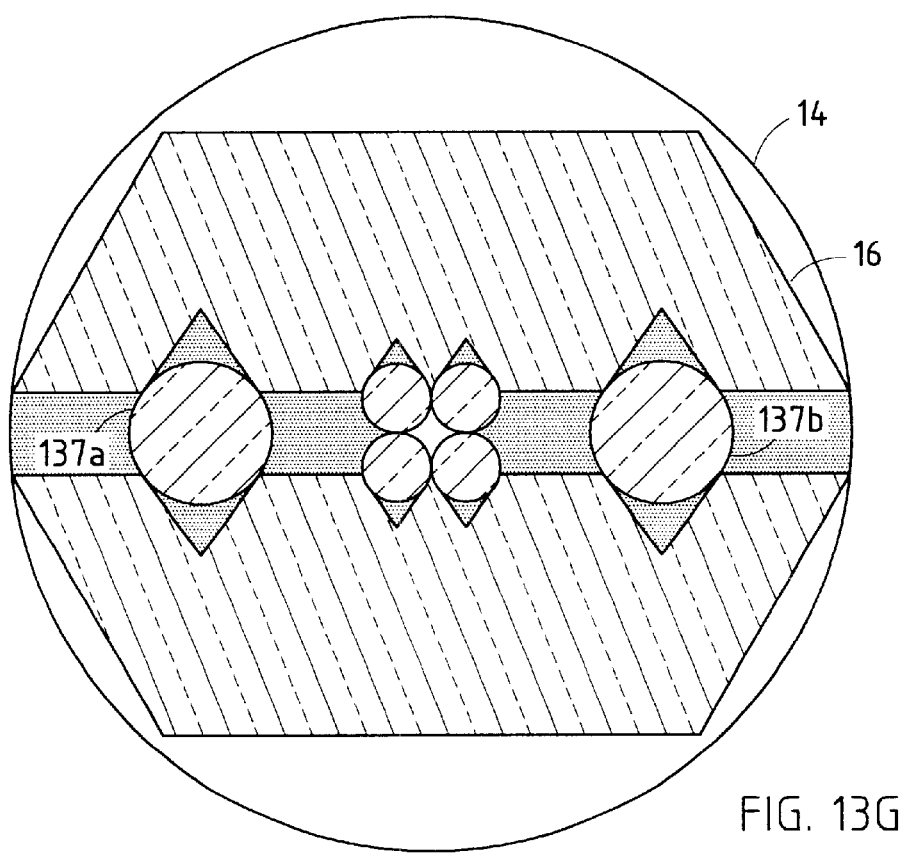
FIG. 13G is a cross-sectional schematic view of a finished two-wafer ferrule inside a glass sleeve.
Figure 13H:
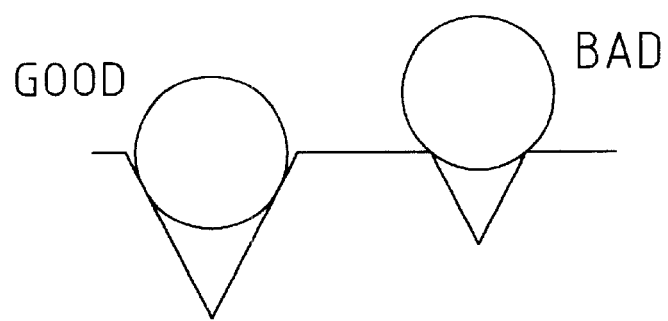
FIG. 13H illustrates the preferred V-groove and alignment rod configuration.

The wafers in FIG. 13F use smaller V-shaped grooves 138 for supporting the fibers 131 and alignment rods/pins 137. The smaller V-shaped grooves prevent the wafers from coming into contact. It is thought that this design will allow the fibers to touch adjacent fibers and thereby prevent movement or repositioning of the fibers 131. In this embodiment, the large V-shaped grooves (i.e. alignment grooves) 138a support the alignment pins 137 and the smaller V-shaped grooves (i.e. fiber grooves) 138b support the fibers 131. The large V-grooves 138a preferably are 246 μm at their widest point. The smaller V-grooves 138b are preferably 120 μm at their widest point. Using this design, the V-grooves that support the fibers 131 can be positioned as desired to vary the separation distance of the fibers 131. Using known etching techniques, the V-grooves can be positioned with a tolerance of about 0.2 μm. This design is easily expanded to more fibers by merely etching more V-grooves for more fibers. Even though the wafers do not touch, the channels formed by the matching grooves are still referred to as capillaries for this specification.

The aligned and bonded wafer ferrule 16 may then be cut, etched, or machined (e.g., polished) to a polygonal or cylindrical shape or other shape as desired so that ferrule may be inserted inside a protective glass sleeve 14. This is illustrated in FIG. 13G. The end-face surface is processed the same as other ferrules, the end-face is ground to an 8° angle, polished, and coated with an anti-reflective (AR) material. One skilled in the art will understand from these examples that there are other similar capillary designs which will similarly support the positioning of optical fibers with tolerances of about 0.5 μm.

Generally, over-etching of the V-grooves is not a problem. If the V-grooves are over-etched, only a uniform vertical shift in the wafers is induced. Of course, if the V-grooves are etched excessively, the fibers and alignment pins may have room to move or reposition. FIG. 13H illustrates the relative position of fibers and alignment pins and V-grooves. The V-groove on the left easily restrains the movement of the fiber. However, the V-groove on the right side provides very little restraint on the fiber and is therefore less desirable.

Figure 13I:
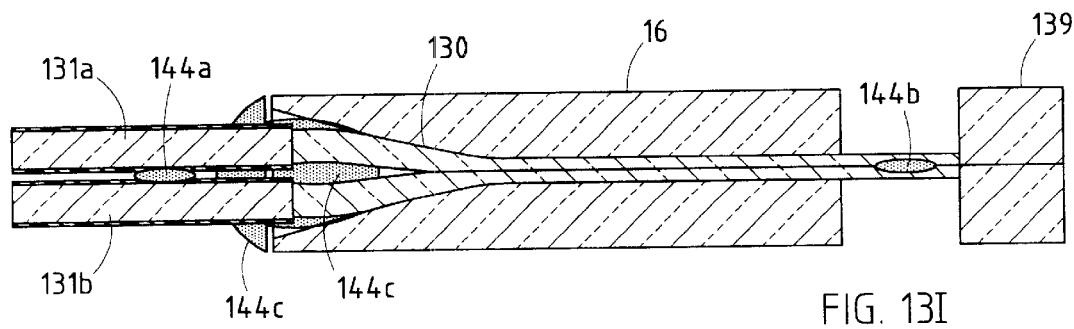
FIG. 13I is a cross-sectional view of a fiber ferrule illustrating alignment of fibers with two wafers and application of liquid adhesive.

While the wafer ferrule design has several advantages, the wafers and alignment rods can be expensive to manufacture and the process of aligning the fibers properly into the V-grooves can be time consuming. A technique to reduce the disadvantages while still taking advantage of the high accuracy of the V-grooves will now be shown. Using this method, a convention ferrule and capillary may be used in combination with wafers to achieve a high degree of accuracy in positioning the fibers at a low cost. The process is as follows and is illustrated in FIG. 13I. A plurality of optical fibers 131 are inserted into a ferrule 16. The fibers 131 are sufficiently long to extend out the end of the ferrule 16. Two silicon wafers are etched with V-grooves in the same manner as discussed above. The two wafers 139 are positioned around the fibers 131 such that the fibers 131 are accurately positioned in the V-grooves as discussed above. The wafers 139 are clamped together with a spring clamp or similar device. The fibers 131 are now accurately positioned and adhesive is applied to hold the fibers in place. Using this technique, an inexpensive ferrule with a low tolerance capillary can be made to position fibers in a very high degree of accuracy which rivals the two-wafer designs discussed above.

The preferred method of applying adhesive to all capillaries includes applying small portions of adhesive 144a and 144b to the fibers 131 just outside of the ferrule 16 to block the flow of subsequently applied liquid adhesive. This adhesive is cured before applying additional adhesive. Additional adhesive 144c is applied to the fibers and the end of the ferrule 16 and allowed to wick through the capillary 130. The liquid adhesive is drawn through the capillary 130 presumably via the process of capillary action and emerges out the end of the ferrule where it is blocked by cured adhesive 144b. The adhesive 144c is cured and the wafers 139 are removed. The fibers 131 and ferrule 16 may then be cut and polished as desired.

Another technique for applying adhesive to the fibers prior to inserting into the ferrule. This technique has the advantage that the fibers are held together by the liquid adhesive by capillary action. The liquid adhesive may be applied by dipping the fibers into the adhesive, or preferably by applying a small amount of adhesive to the fibers.

Figure 13J:
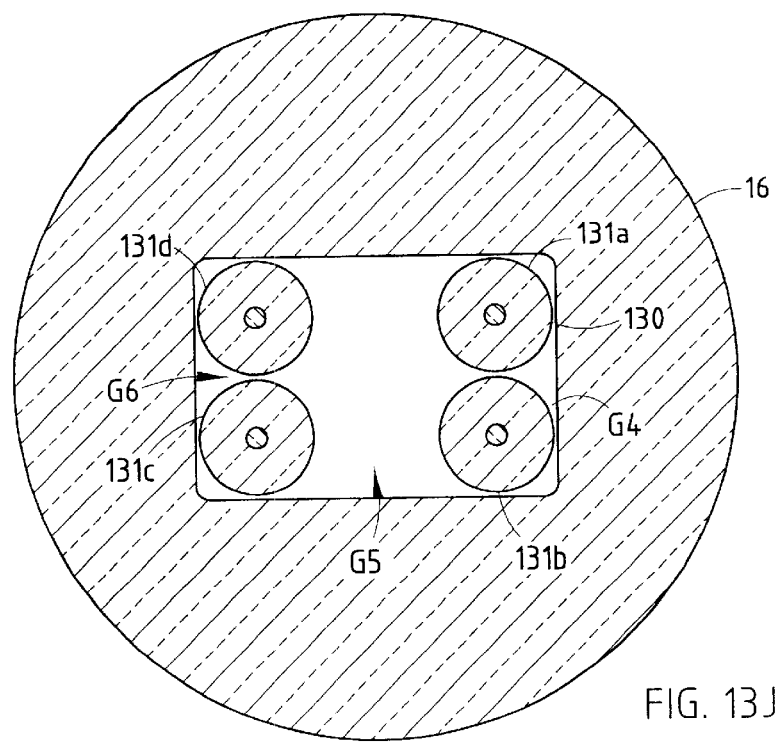
FIG. 13J is a cross-sectional view of a fiber ferrule having a rectangular capillary for variable separation distance.

There is another design for achieving variable separation distance illustrated in FIG. 13J. In this design a rectangular capillary 130 supports four fibers 131. The fibers are positioned against the walls of the capillary 130 and therefore the separation distance is controlled by the width of the capillary 130. The gaps, G4 and G6, are preferably less than about 1.5 μm, and more preferably less then about 1.0 μm, and most preferably less than about 0.5 μm. However, the horizontal gap G5 between fibers may be as wide as desired. In other words, gap G5 is the shortest or minimum distance between the cladding of adjacent fibers 131b and 131c.

Figure 13K:
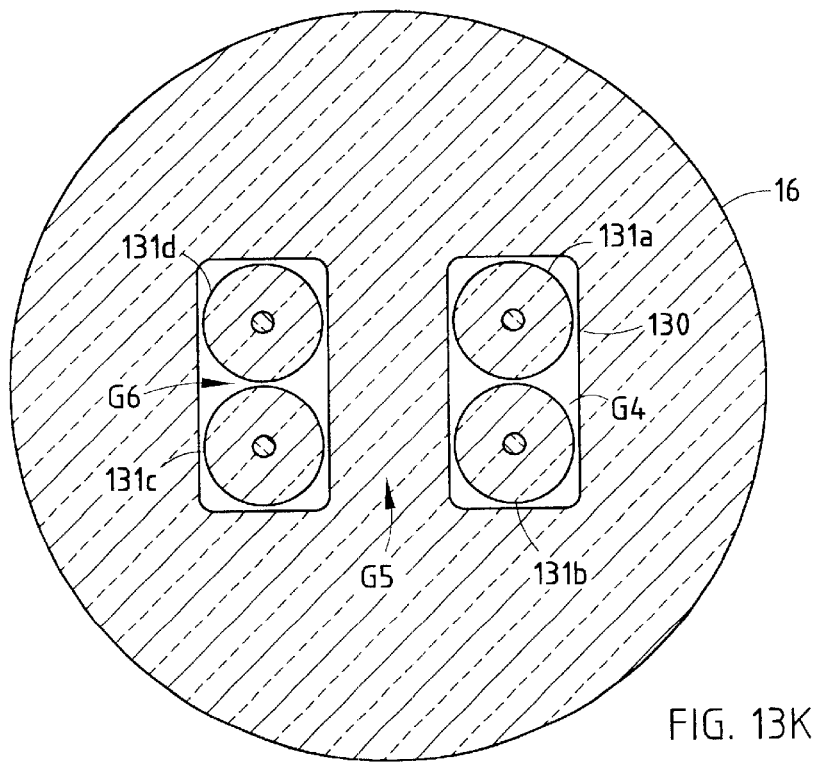
FIG. 13K is a cross-sectional view of a fiber ferrule having dual rectangular capillaries for variable separation distance.

Yet another design is the dual-rectangle capillary illustrated in FIG. 13K. The capillaries 130 may be manufactured to tolerances of less than 1.0 μm using currently known techniques and therefore the separation distance between the fibers can be closely controlled. The dimensions of the capillaries 130 specified to be 2.0 μm wider and taller than the dimensions of the fibers 131. The tolerance for the capillaries 130 is 2.0 μm. Therefore, there is room for inserting the fibers into the capillaries and while limiting the repositioning of the fibers.

Figure 13L:
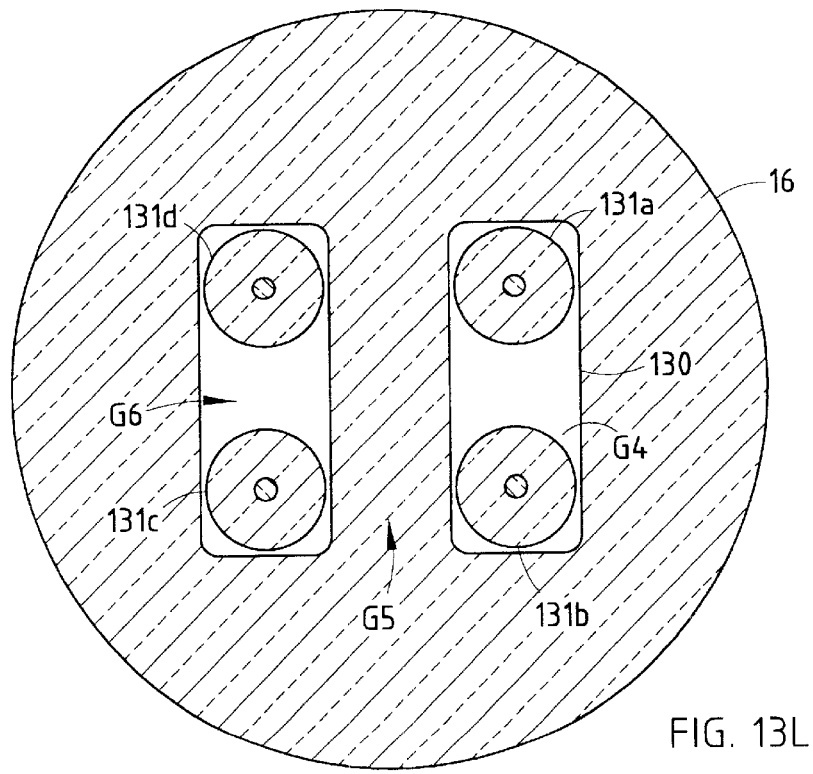
FIG. 13L is a cross-sectional view of a fiber ferrule having elongated dual rectangular capillaries.

Still yet another embodiment is illustrated in FIG. 13L. This embodiment allows variable positioning of the fibers 131 in both the horizontal and the vertical positions as seen in the figure. This embodiment is similar to FIG. 13K in both design and tolerances. Although the design in FIG. 13L can be used to achieve large separation distances between the fibers 131, the fibers can more easily be repositioned within the capillaries 130 due to stresses such as adhesive curing and thermal changes. It should be noted that some care must be taken to provide a reasonable separation between the capillaries 130. It has been found that small separations lead to fractures and breaks in the glass between the capillaries. In this embodiment, gap G6 is the shortest or minimum distance between the surface of the cladding of the adjacent fibers 131c and 131d.

Figure 13M:
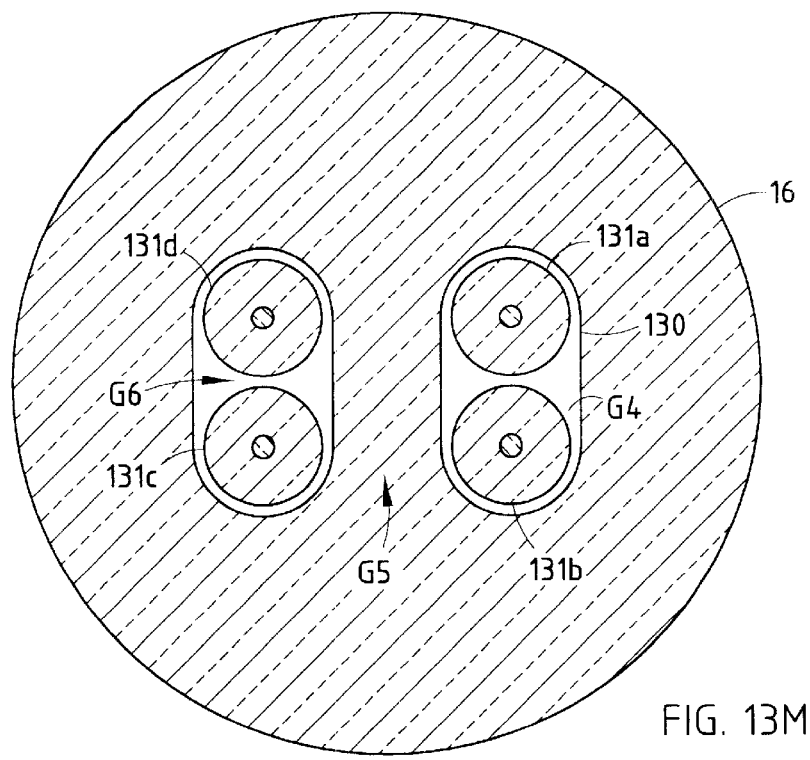
FIG. 13M is a cross-sectional view of a fiber ferrule having dual oval capillaries.

FIG. 13M illustrates another dual capillary design similar to the design of FIG. 13K. However, in this instance the capillaries are ovals instead of rectangles. The same fabrication techniques and tolerances apply to this embodiment.

Figure 13N:
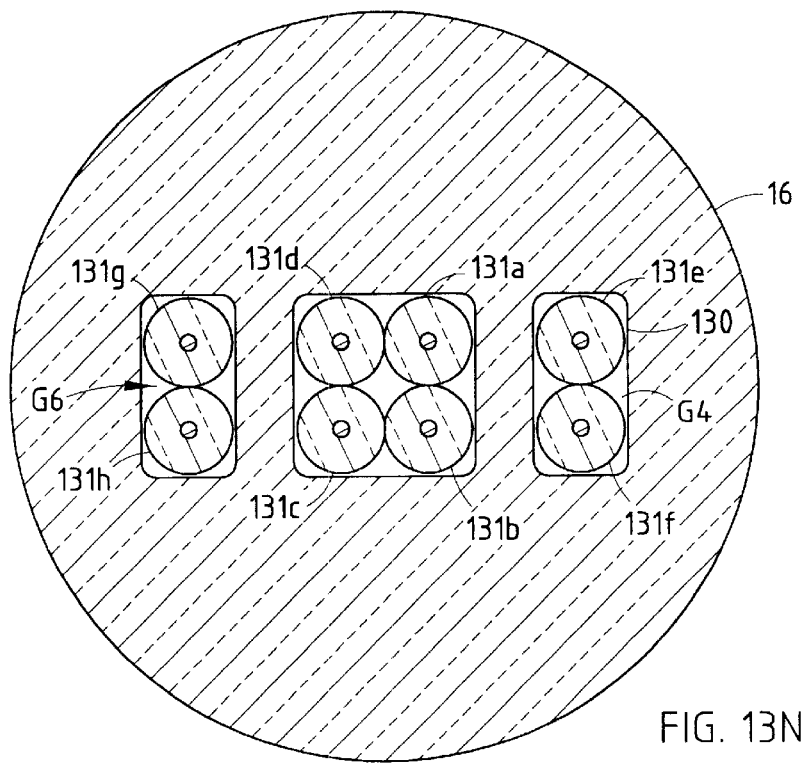
FIG. 13N is a cross-sectional view of a fiber ferrule having three capillaries.

A hybrid of both fixed and variable separation distance fibers is illustrated in FIG. 13N. This hybrid design incorporates features of the various designs discussed above. An advantage of this design is the large number of fibers (for example, 8 as shown in the illustrated embodiment) that are fit into a single ferrule. However, the separation distance for the fibers is not equal. The four fibers 131a–131d in the middle capillary have a small separation distance while the outer fibers 131e–131h have larger separation distance. In this embodiment it is preferred that the optical fibers are paired as follows: fiber 131a with 131c; fiber 131b with 131d; fiber 131e with 131g; and fiber 131f with 131h. Because of the two different separation distances, this design is generally not preferred for use with thin-film filters. This design is suitable for isolators and other optical elements which are not sensitive to AOI.

Yet another process and apparatus for positioning optical fibers inside of a ferrule uses alignment washers to precisely position the fibers. This process is illustrated in FIGS.14A and B. The process uses alignment washers 140 shown in FIG. 14A. Washer 140 is shown having four apertures 141 for receiving optical fibers; however, it is easily scalable to larger numbers of optical fibers. Alignment washer 140 allows precision fiber placement into a ferrule 16 using simple and highly manufacturable components. Photolithography technology may be used to manufacture the washers 140 with the precisely positioned apertures 141 and spacing between them. The diameter of apertures is preferably about 126 μm which provides approximately 0.5 μm gap between the fiber and the wall of the aperture. The tolerances for the location of the apertures are also preferably less than about 1.0 μm and more preferably less than about 0.5 μm for each pair of the input and reflective fibers. For example, the tolerance for the distance "D4" between the apertures 141d and 141b is preferably 0.5 μm. The same is applicable to the distance "D5" between apertures 141a and 141c. However, the tolerance for the distance "D6" between adjacent apertures such as 141a and 141b is preferably less than about 1.0 μm and more preferably less than about 0.5 μm. A photoresistive material is used to fabricate the washers 140. Any other technique may be used to form the washer as long as the necessary tolerances are achieved. The washers 140 are used as optical fiber-guiding and constraining devices. The capillaries described above generally result in restricting fiber movement or shifting to less than about 0.5 μm.

Turning to FIG. 14B there is shown a cross-section view of the washers 140, fibers 142, and ferrule 16. Fibers 142 are inserted through first washer 140a, through ferrule 16, and through a second washer 140b. Ferrule 16 may have a conventional cylindrical capillary 130. However, the invention may be adapted for use with most capillaries regardless of shape. At this step of the process, it may be helpful to pre-heat the assembly to aid in the installation and precise placement of the fibers 142. The assembly may then be cooled to room temperature to hold the fibers 142 in position while adhesive is applied. Washers 140 are bonded to the end-faces of ferrule 16. In the case of a ferrule having a cone portion for receiving fibers (see FIG. 5), the washer 140 is preferably bonded at the base of the cone portion where the capillary 130 meets the cone portion. The ferrule capillary 130 is filled with a liquid adhesive via the gap created by the flat portion 143 of washer 140 and either UV cured or thermally cured. The flat portion 143 may also be used to align the fibers at each end of the ferrule prior to curing the adhesive. When both flat portions are aligned, then the fibers are also aligned. The completed assembly is processed the same as a conventional ferrule; the end-face is ground to approximately an 8° angle, polished, and an AR coating is applied. Filter AOI and Fiber SD are discussed next.

For all of the fiber capillaries discussed above, it is important to achieve accurate SD so that the SD can be accurately matched with a filter AOI as discussed in the next section. Further, when manufacturing a fiber-ferrule having multiple pairs of fibers, it is important for SD for all of the pairs to be approximately equal (with a tolerance of about 0.5 μm) since this tends to make the active alignment process easier and more successful.

The next aspect of the invention is the relationship between the filter angle of incidence (AOI) and the optical fiber separation distance (SD). The tolerances for SD are precise so that light signals are directed to within about 0.5 μm of the center of a desired optical fiber core. It is helpful to define some terms prior to the general discussion of AOI and SD.

Filter AOI is well known in the art and does not require lengthy explanation. Generally, filter AOI is useful in tuning a filter to a desired center wavelength (CWL). Each filter is characterized according to its CWL and AOI. The AOI value represents the desired angle of incidence for optimal performance of the filter. For proper operation and low insertion loss, the filter should be matched to a pair of optical fibers having a corresponding SD.

Separation distance (SD) is defined, for purposes of this specification, as the distance between the center of the optical fiber cores of two optical fibers. The term generally refers to SD between pairs (i.e., an input fiber and a reflective fiber) of optical fibers. In the preferred embodiment of the invention, SD ranges from about 125 μm to about 250 μm. This range of SD corresponds to an AOI range from about 2° to about 3° as discussed below (see FIG. 15).

It has been found that a precise, cost effective and stable alignment of a filter assembly 10 can be achieved by selecting components having matching characteristics. For example, the components of a filter assembly include the fiber ferrule 16, collimating lens 22, and filter 24. The characteristics, which need to be matched, include the filter AOI, the collimating lens AOI, and the optical fiber SD. The optics of GRIN lenses are understood and manufacturing a GRIN lens to match a desired AOI is known in the art. Matching the filter AOI and optical fiber SD is not as easy.

Generally, matching of filter AOI and fiber SD is done by creating a database of measurements for the different sets of the filter chips and the ferrules. First, filters are tested and characterized according to CWL and AOI. The measurements may be performed as follows. A filter is assembled into a filter assembly 10 or similar device so that a light signal may be directed onto the filter. A light signal is transmitted into input optical fiber 18, transmitted through the collimating lens 22 to filter 24. The output of filter 24 is monitored and the pass frequency or CWL of the filter is determined. The angle of the light signal impacting relative to the filter is adjusted until the desired output signal from filter 24 is achieved. Typically for the commercial thin film filters the resulting AOI is between about 1.8° and 3°.

While the filter 24 is at the desired AOI, the corresponding SD may be determined by correlation with the SD data on the ferrule sets.

Repeated testing and measurement for various filters AOI yields an accurate database that relates filter AOI to a corresponding SD of the ferrule. Those skilled in the art understand that these measurements will vary depending on the optical characteristics of a specific design of a filter assembly and therefore should be performed on the specific device for best results.

After the measurements are made and the database created, tolerances may be generated for matching input collimating assemblies with filters for a given packaging tolerance accuracy. A table as shown in FIG. 15 can be generated showing the range of SD that may be matched to a corresponding range of filter AOI. The components can be categorized and placed in labeled bins so that matching parts may be done quickly and efficiently. As can be seen in FIG. 15, the range of each SD category is preferably about 3–4 $\mu$m. This tolerance of 3–4 $\mu$m is satisfactory for achieving an ultimate tolerance of 0.5 $\mu$m since the filter 24 may be tilted a small amount to compensate for such small variances in SD without significantly changing the CWL of the filter.

The table may also be arranged for tighter tolerances if desired. This may be desirable in some cases where CWL must be very precise since changes in filter AOI effect the CWL of the filter. Ideally, the SDs for each pair of fibers in an input assembly will be identical or within about 2 $\mu$m and therefore will place the input assembly into one of the predefined categories as shown in FIG. 15.

Once the matching input collimating assembly (4-port or multiple-port) 35 and the filter 24 are selected, they may be assembled as discussed above to form a filter assembly 10. The four-port input and dual-fiber output collimating assemblies will be aligned for a maximum transmitted signal and then soldered with the outer sleeve 32 (FIG. 3) precisely retaining the interrelationships between these collimating assemblies. The assembly of the complete multiple-port device 30 is discussed next.

Input and output collimating and filtering assemblies are affixed inside protective sleeve 32. Output fiber-ferrule collimating assembly 35' is manufactured in nearly the same way as input collimating assembly 35. However, depending on the application, fewer of the fiber pigtails 38 may be needed. Also, it is preferred to use an a spheric collimating lens (which may be a molded a spheric lens) instead of a GRIN lens in the output collimating assembly 35'. A spheric lenses have advantages in application to 6 port and higher port devices as compared to GRIN lenses. First, a spheric lenses have a long working distance, defined as the distance from the front focal point to the front surface of the lens. For multiple-port devices, the input and output collimating assemblies should have their focal points coincide in order to optimize the insertion loss. This point should also coincide with the filter coating surface of the filter. For miltiple-port collimating assemblies that are on the substrate side of the filter, the working distance must be large enough, or the filter must be thin enough, so that the focal point can be placed on the filter coating surface of the filter. If GRIN lenses alone are used, then the filter thin films and substrate would need to be very thin (on the order of 240 times the refractive index of the substrate, in $\mu$m). At this thinness, the filter films and substrates would have limitations associated with film stress and also high susceptibility to breakage, cracking, etc. during manufacturing. Aspherical lenses have working distance on the order of 2 mm which allows a standard filter and substrate thickness of about 1.5 mm (and larger) to be used. Therefore, a preferred configuration includes a four fiber ferrule, a GRIN or asphere lens, a bandpass (thin film filter) coating, a substrate, an asphere, and a dual fiber ferrule. The following configuration is also possible while still optimizing insertion loss: a four fiber ferrule, an asphere lens, a substrate, a bandpass (thin film filter) coating, a GRIN or asphere, and a dual fiber ferrule.

Another advantage of a spheric lenses is the flexibility in focal length. In order to keep the angle of incidence to the filter low, a longer focal length of the lens is desirable. This is relatively easy to accomplish with an a spheric lens. Molded asphere lenses are available with many different focal lengths at a low cost. For GRIN lenses, to make the focal length longer, the index profile must change, which represents a significant departure from the standard doping process. It is difficult and costly to obtain GRIN lenses at arbitrary focal lengths. All of the above makes aspherical lenses more attractive for this application.

Preferably, the output collimating assembly 35' is manufactured in the same way and to the same tolerances as the input collimating assembly 35. This is preferred so that the location of output optical fibers 38 will match with the corresponding reflective fiber 20 in the input collimating assembly 35. Also, it is easier to determine the SD characteristic. If pairs of optical fibers are not used in the output collimating assembly 35', then an estimate of the SD is made. The output collimating assembly 35' is optically aligned with filter 24 by micro-tilting, rotating, and axially adjusting the assembly 35' for maximum transmission. This is possible because the interior dimension of protective sleeve 32 is substantially larger than the exterior dimensions of output assembly 35'. Micro-tilting may be achieved by a micro-tilting device grasping both the protective sleeve 32 and the end of the output assembly 35' that extends from the protective sleeve 32. The preferred embodiment provides a gap of about 50–100 $\mu$m which is sufficient to permit micro-tilting of output assembly 35' inside of sleeve 32. Once the active alignment of output collimating assembly 35' is complete, output collimating assembly 35' is affixed using a solder or adhesive 33 which is inserted into the gap between the exterior of collimating assembly 35' and the protective sleeve 32.

The previous discussion has related to how to manufacture multiple-port devices such as four-fiber ferrules and six- and eight-port filtering packages. The following discussion relates to further applications of these devices and additional advantages of the invention.

Figure 16A:
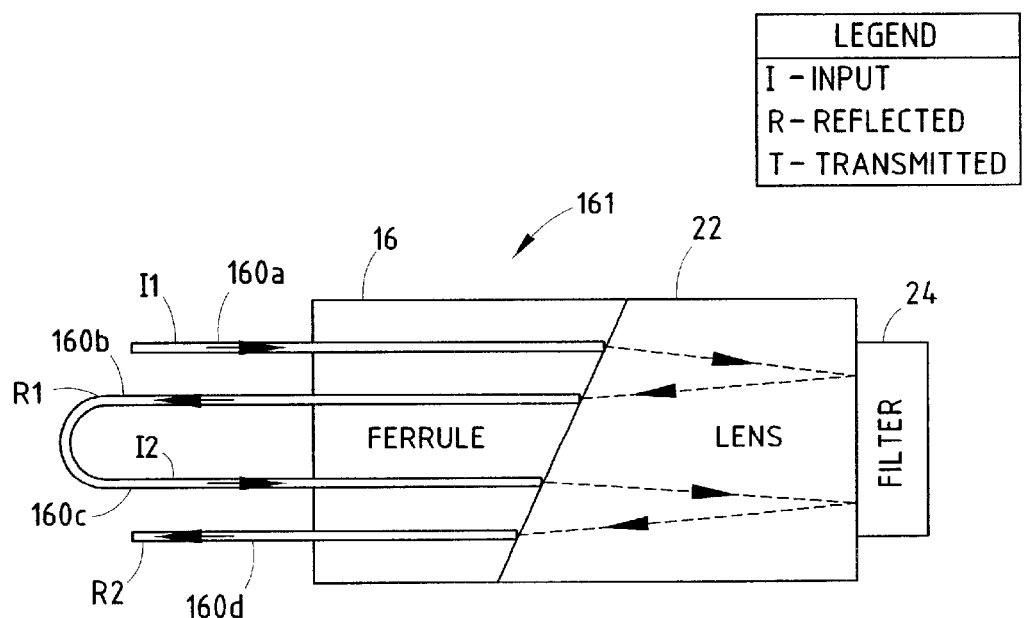
FIG. 16A is a schematic diagram of a four-port filter assembly.

Turning first to FIG. 16A there is shown a schematic diagram of a four-port filtering assembly which includes a first input fiber 160a, a first reflective fiber 160b coupled to a second input fiber 160c, and a second reflective fiber 160d. Also illustrated are ferrule 16, lens 22, and filter 24. In operation, a light signal is input through first input fiber 160a, collimated by lens 22 and partially reflected by filter 24. The reflected signal received by first reflective fiber 160b and communicated to second input fiber 160c. The signal is again collimated by lens 22 and partially reflected by filter 24 and finally received by second reflective fiber 160d which can communicate the signal to an optical communications system, network or a desired destination. Features of this device provide enhanced performance which is useful in optical communication systems.

First, the same filter is used to reflect the signal each time. This is an advantage over devices that required two distinct filters to perform this function. Further, the performance is enhanced because the filtering characteristic is identical for each reflection. In devices using two filters, the filters typically have filtering characteristics, that are similar but not identical. Therefore, this design may result in improved filtering characteristics such as, for example, sharper and steeper cut-off frequencies. An example of uses for such devices is a notch filter. Typically one reflection from a thin-film notch filter will provide 12 to 15 dB of separation. A second reflection from the same filter will yield a separation of 24 to 30 dB. The device also has application to various other shaping filters.

A second feature which improves performance is the coupling between the first reflective fiber 160b and the second input fiber 160c. Both of these fibers may be formed from a single, unbroken optical fiber. This eliminates the requirement for an optical coupling device between two separate fibers. Coupling devices typically have insertion loss associated with their use. Elimination of the coupling device therefore improves the performance of the four-port filter 161.

Figure 16B:
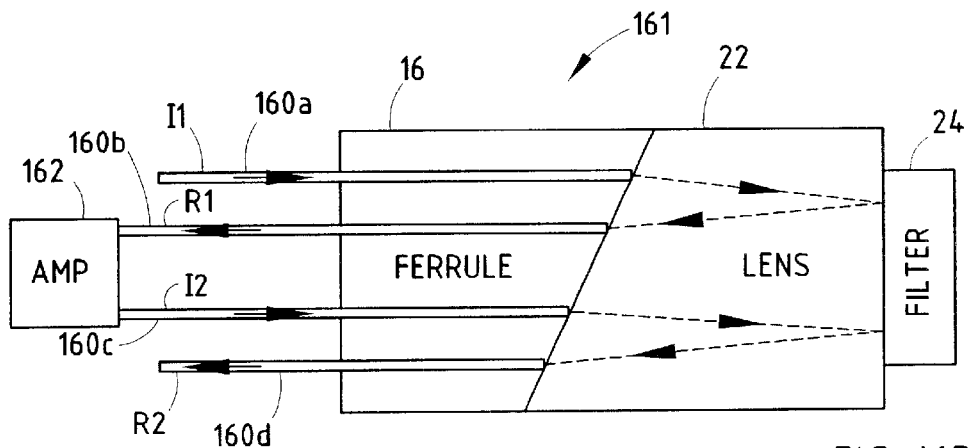
FIG. 16B is a schematic diagram of a four-port filter assembly coupled to an amplifier.

Another embodiment of the four-port filter 161 is suitable for gain flattening filters commonly associated with optical amplifiers. As illustrated in FIG. 16B, a signal is input by first input fiber 160a, reflected by gain flattening filter 24 to first reflective fiber 160b. The signal is amplified by amplifier 162 and communicated to second input fiber 160c. The signal is again reflected by gain flattening filter 24 to second reflective fiber 160d.

Figure 16C:
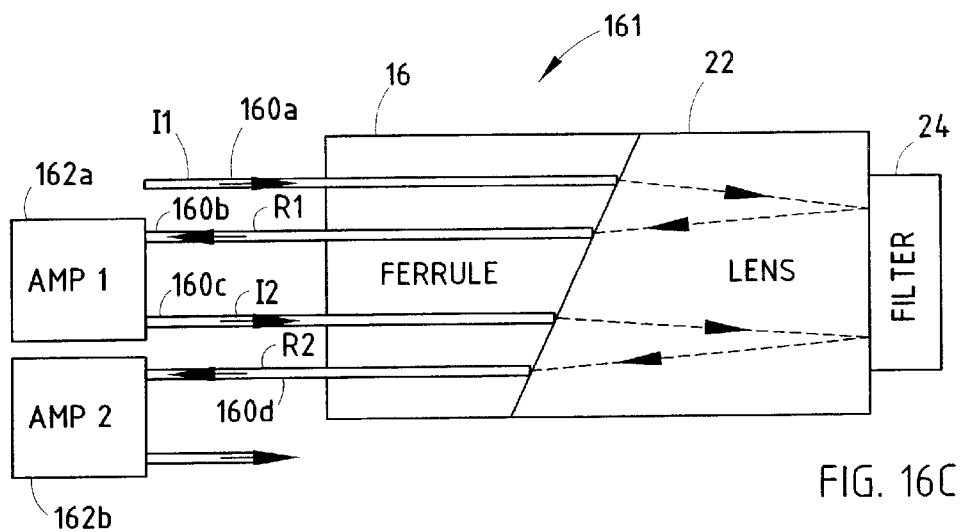
FIG. 16C is a schematic diagram of a four-port filter assembly coupled to two amplifiers.

In another embodiment, a single filter assembly 161 may be used to gain flatten the signals from two amplifiers 162. FIG. 16C shows a schematic view of filtering assembly 161 coupled to two amplifiers 162a and 162b. A light signal is input through fist input fiber 160a and reflected by gain-flattening filter 24. The reflected signal travels through first reflective fiber 160b to first amplifier 162a. The amplified signal travels back to filter assembly 161 through second input fiber 160c where it is again reflected by gain-flattening filter 24 and output through second reflective fiber 160d to second amplifier 162b.

Figure 16D:
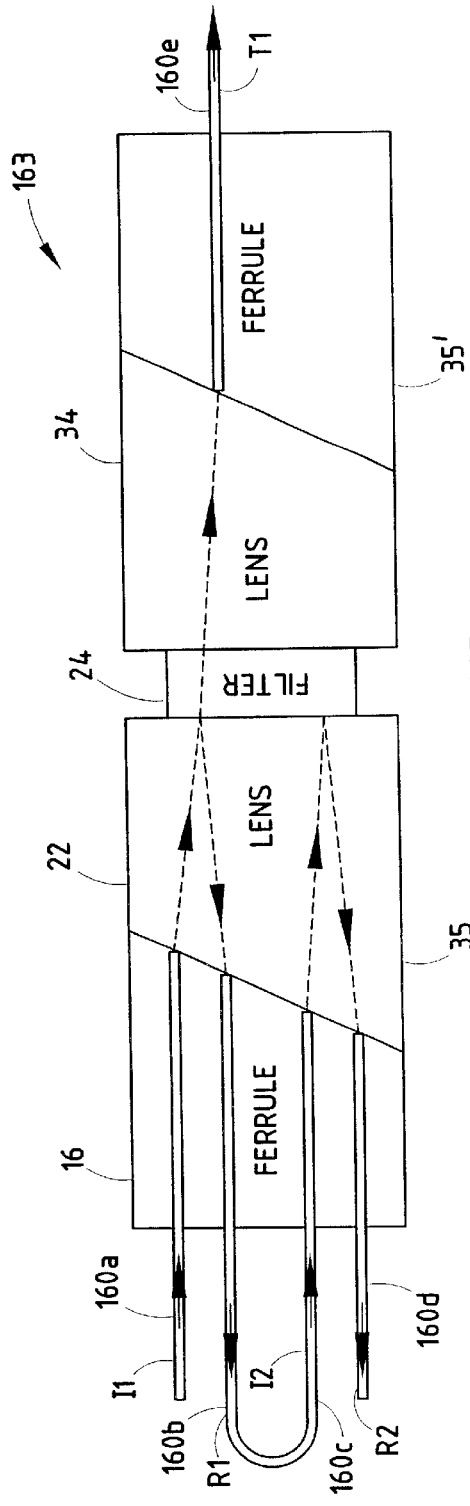
FIG. 16D is a schematic diagram of five-port filter package.

FIG. 16D is an opto-mechanical schematic of a five-port filter 163. The operation of the filter is very similar to the assembly of FIG. 16A; however, this five-port filter includes an output collimating assembly for receiving the signal transmitted through the filter 24. Filter 24 may be any of a variety of thin film filters, such as, for descriptive purposes, a narrow band-pass filter. A light signal is input by first input fiber 160a, collimated by lens 22 and partially reflected by filter 24. The selected narrow band portion of the signal is transmitted through the filter 24 to transmitted fiber 160e. The reflected portion of the signal is communicated through first reflective fiber 16b and second input fiber 160c and reflected again by filter 24. The twice reflected signal is then output by second reflective fiber 160d and the isolation from the transmitted frequency is as high as 24–30 dB.

Figure 16E:
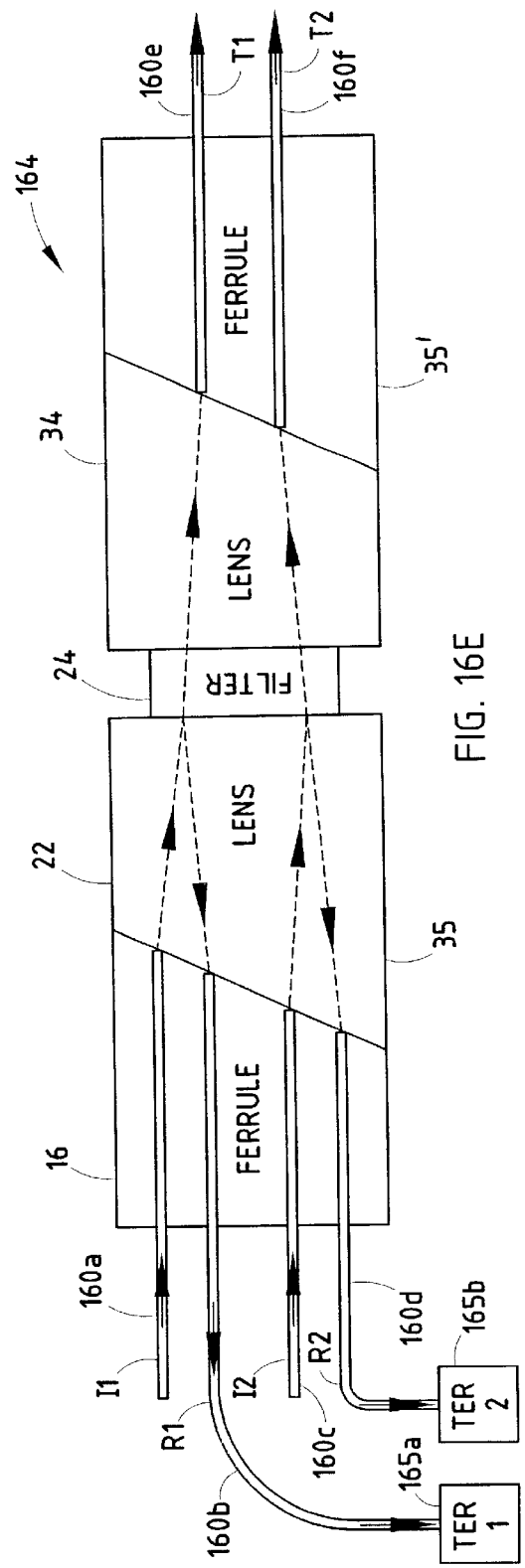
FIG. 16E is a schematic diagram of a six-port filter package coupled to waste energy terminals.

In yet another embodiment, the filtering package is coupled to heat sink ports or terminals 165 to dissipate excess signal energy. In this embodiment, illustrated in FIG. 16E, filter 24 may be any of a variety of thin film-type filters such as a band-pass filter or gain-flattening filter. A first input signal is transmitted through first input fiber 160a, collimated by lens 22 and partially reflected and partially transmitted by filter 24. The transmitted portion is transmitted through lens 34 to first transmitted fiber 160e which is presumably coupled to a communications system. The reflected portion of the first input signal is reflected back through lens 22 to first reflective fiber 160b which is coupled to a first terminal 165a. Terminals 165 are heat dissipation devices commonly known in the art which harmlessly dissipate the waste energy. A similar path is followed by a second light signal that is transmitted through second input fiber 160c. The transmitted portion of the signal is transmitted to second transmitted fiber 160f and the reflected waste energy portion is channeled to a second terminal 165b via second reflective fiber 160d.

FIG. 16F illustrates another embodiment with integrated waste energy heat sink ports. However, in this embodiment the heat sink terminals 165 are coupled to the transmitted fibers 160e and 160f. The reflected signals are output through first and second reflective fibers 160b and 160d and presumably connected to a communications system.

FIG. 16G is a schematic diagram of an add/drop package using the instant invention. Filter 24 is a thin-film band pass filter which passes light at wavelength λ1 and reflects all other wavelengths. Lenses 22 and 34 are preferably collimating GRIN lenses. A first light signal enters via input fiber $I_1$ with wavelengths $\lambda_1 \ldots \lambda_n$. Wavelength $\lambda_1$ is transmitted to fiber $T_1$ and wavelengths $\lambda_2 \ldots \lambda_n$ are reflected to fiber $R_1$, and thereby one channel or wavelength is dropped or de-multiplexed from the input signal. Conversely, another signal is input to fiber $I_2$ with wavelengths $\lambda_2 \ldots \lambda_n$ and a third signal is input to fiber $I_3$ with a wavelength of $\lambda_1$. The wavelengths $\lambda_2 \ldots \lambda_n$ are reflected by filter 24 to fiber $R_2$. In addition, the wavelength $\lambda_1$ is transmitted through filter 24 to fiber $R_2$. Therefore fiber $R_2$ exits the package 171 with wavelengths $\lambda_1 \ldots \lambda_n$ and thereby one channel or wavelength is added or multiplexed into the original signal from fiber $I_2$.

Figure 16H:
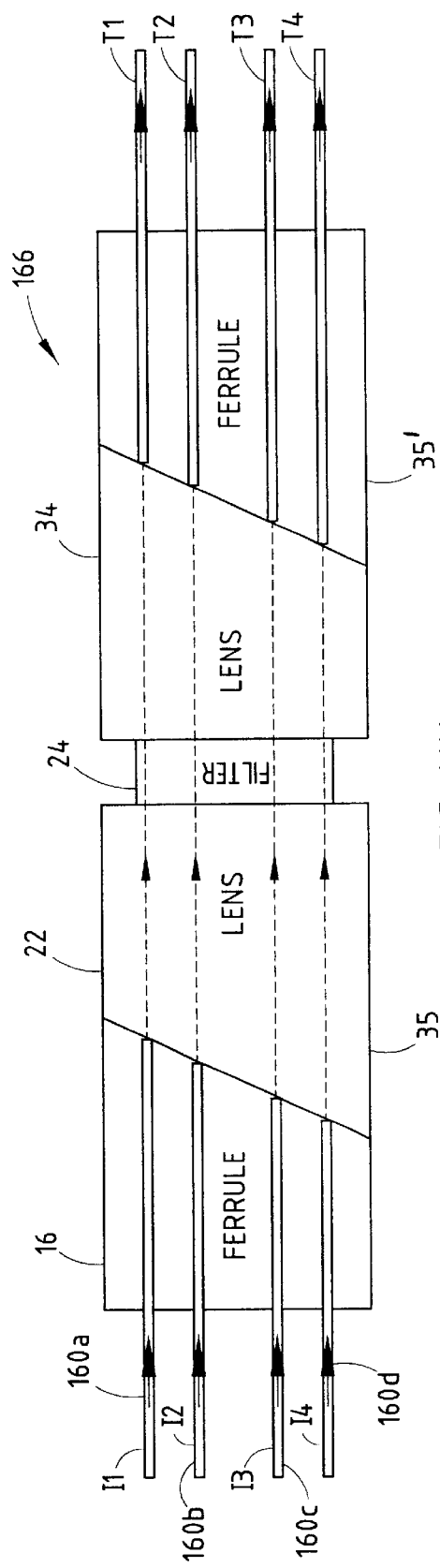
FIG. 16H is a schematic diagram of an eight-port optical package.

FIG. 16H is a schematic diagram of an eight-port package 166. This embodiment includes four input fibers $I_1 \ldots I_4$ that are coupled to four transmitted fibers $T_1 \ldots T_4$ through an input collimating lens 22, an optical element 24, and an output collimating lens 34. The optical element may be any of various shaping filters such as a gain-flattening filter or band-pass filter. However, this embodiment is particularly well-suited to be used with a crystal element, such as an isolator, as the optical element of choice.

Figure 16I:
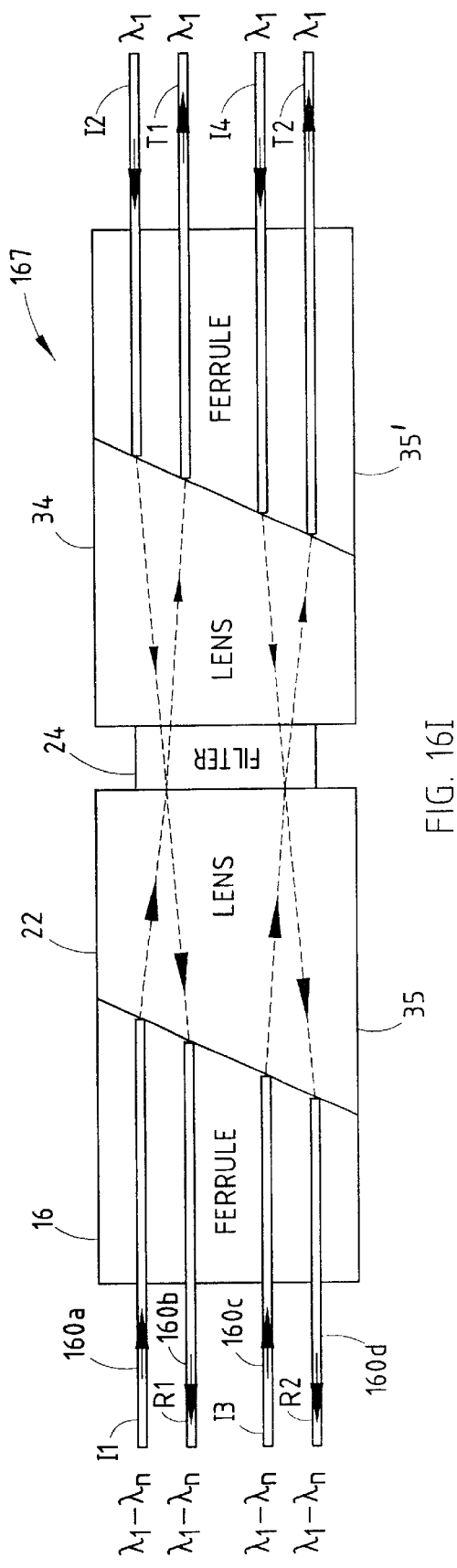
FIG. 16I is a schematic diagram of an eight-port add/drop package.

The final embodiment of an optical package is an eight-port add/drop device. FIG. 16I is a schematic diagram of the package which is capable of both adding and dropping a channel for two separate light signals. The operation is as follow. A first light signal with wavelengths $\lambda_1 \ldots \lambda_n$ is input through fiber $I_1$. Filter 24 is a band pass filter which passes only light of wavelength $\lambda_1$ and reflects all other wavelengths. Therefore, wavelength $\lambda_1$ is transmitted to fiber $T_1$ and the remaining wavelengths, $\lambda_2 \ldots \lambda_n$, are reflected to fiber $R_1$. A second signal having a wavelength $\lambda_1$ is input through fiber $I_2$. Fiber $I_2$ is optically aligned with fiber $R_1$ and therefore the signal is passed through filter 24 and coupled to fiber $R_1$ and the resulting signal on fiber $R_1$ contains wavelengths $\lambda_1 \ldots \lambda_n$. Thus, the original channel at wavelength $\lambda_1$ and a new channel at wavelength $\lambda_1$ has been added. The same operation is accomplished on fibers $I_3$, $I_4$, $R_2$, and $T_2$.

Figure 17:
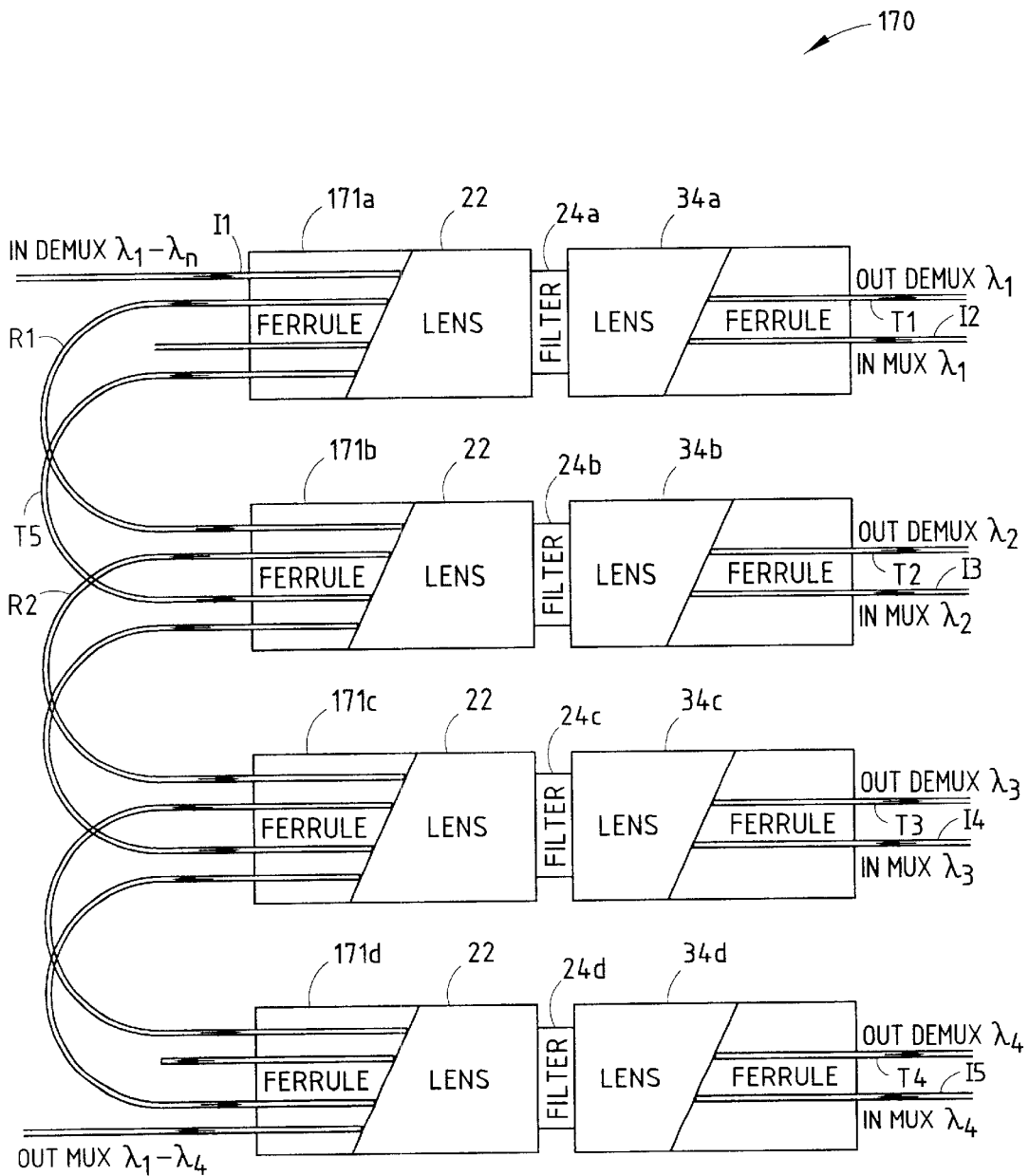
FIG. 17 is a schematic diagram of concatenated six-port packages to form a DWDM module.

In yet another embodiment, a compact DWDM module is created as schematically illustrated in FIG. 17. This figure illustrates a four-channel add/drop module useful in a communications system. Concatenating four six-port filtering packages 171 (such as described in relation to FIG. 16G) together creates the module. Beginning with the de-multiplex (i.e. drop function), the demux signal containing wavelengths $\lambda_1 \ldots \lambda_n$ enters the package via first input fiber $I_1$ of package 171a and is collimated by input lens 22. A portion of the signal, $\lambda_1$, is transmitted through filter 24a and transmitted out of the module via transmitted fiber $T_1$. The remaining wavelengths $\lambda_2 \ldots \lambda_n$ are reflected to reflective fiber $R_1$ and communicated to the first input fiber of package 171b. Filter 24b in package 171b transmits wavelength λ2 to transmitted fiber $T_2$ and reflects the remaining wavelengths $\lambda_3 \ldots \lambda_n$ to reflective fiber $R_2$ which communicates the signal to the first input fiber of package 171c. The process continues and wavelength $\lambda_3$ is transmitted to fiber $T_3$ in package 171c. Similarly, wavelength $\lambda_4$ is transmitted to fiber $T_4$ in package 171d.

The DWDM module 170 also multiplexes signals. Starting with the second input fiber I2 of package 171a, a signal of wavelength $\lambda_1$ is transmitted through filter 24a to transmitted fiber T5 and coupled to package 171b. In package 171b a signal of wavelength $\lambda_2$ is similarly input and transmitted through filter 24b. Filter 24b reflects wavelength $\lambda_1$ and thereby causes both wavelengths to be multiplex and communicated to package 171c. In package 171c, wavelength $\lambda_3$ is added to wavelengths $\lambda_1$ and $\lambda_2$. The signal containing all three wavelengths is communicated to package 171d where wavelength $\lambda_4$ is added.

It will become apparent to those skilled in the art that various modifications to the preferred embodiment of the invention as described herein can be made without departing from the spirit or scope of the invention as defined by the appended claims.

The invention claimed is:

1. A method of building a six-port optical package comprising the steps of:
   providing an input ferrule comprising at least one capillary extending axially through the ferrule;
   providing a first pair of optical fibers and a second pair of optical fibers, each fiber having a core;
   precisely positioning the optical fibers inside of the at least one capillaries, such that the first pair of fibers defines a first separation distance between the centers of the cores of the first pair of fibers, the second pair of fibers defines a second separation distance between the centers of the cores of the second pair of fibers, and such that the first and second separation distances are substantially equal to one another within a separation distance tolerance of 2.0 μm;
   providing a collimating lens;
   optically aligning the collimating lens with the optical fibers inside of the capillary;
   providing an optical element; and
   optically aligning the optical element with the collimating lens.

2. The method of claim 1 wherein the separation distance tolerance is 1.0 μm.

3. The method of claim 1 wherein the optic fibers are screened for predetermined geometric characteristics.

4. The method of claim 3 wherein at least one geometric characteristic is selected from the group consisting of core concentricity, ovality, and cladding diameter.

5. The method of claim 4 wherein the fibers satisfy a tolerance of 1.0 μm for core concentricity, a tolerance of 1.0 μm for cladding diameter, and a tolerance of 0.8 percent for ovality.

6. The method of claim 5 wherein the step of precisely positioning the fibers comprises using a fiber constraining device selected from the group consisting of a square capillary, a rectangular capillary, a parallelogram capillary, a dual-oval capillary, a quad-circular capillary, two wafers forming a capillary, and an alignment washer.

7. The method of claim 6 further comprising the steps of:
   characterizing the optical element according to AOI;
   characterizing the input ferrule according to separation distance; and
   selecting the optical element and the fiber ferrule to match within predetermined tolerances of AOI and separation distance.

8. The method of claim 7 wherein the step of optically aligning comprises actively aligning said optical element with said collimating lens by repetitively tipping and tilting said optical element relative to said lens.

9. The method of claim 8 further comprising the step of applying liquid adhesive to said fibers, said adhesive applied sufficiently close to said ferrule such that the liquid adhesive is drawn into said capillary.

10. The method of claim 9 wherein a second liquid adhesive is applied to said fibers to hold the fibers together prior to positioning the fibers inside of the at least one capillaries.

11. A six-port optical device comprising:
    a ferrule comprising at least one capillary extending axially through said ferrule;
    two pair of optical fibers extending through said at least one capillaries, said fibers satisfying predetermined tolerances for core concentricity, ovality, and cladding diameter, wherein the predetermined tolerance for ovality is equal to or less than about 0.8 percent;
    a collimating lens optically aligned with said ferrule; and
    an optical element optically aligned with said collimating lens.

12. The six-port optical device of claim 11 wherein said two pairs of fibers include a first pair of fibers defining a first separation distance between the centers of the cores of the first pair of fibers, the second pair of fibers defines second separation distance between the centers of the cores of the second pair of fibers, and the first and second separation distances are substantially equal to one another within a tolerance of 2.0 μm.

13. The six-port optical device of claim 12 wherein said at least one capillaries are selected from the group of capillary types consisting of a square capillary, a rectangular capillary, a parallelogram capillary, a dual-oval capillary, a quad-circular capillary, two wafers forming a capillary, and a capillary comprising an alignment washer.

14. The six-port optical device of claim 13 wherein said optical element is characterized according to AOI and said ferrule is characterized according to the separation distance of the pairs of optical fibers inside the ferrule and wherein said optical element and said ferrule are selected to match within predetermined tolerances for AOI and separation distance.

15. The six-port optical device of claim 14 wherein the optical fibers satisfy a tolerance of 1.0 μm for core concentricity and a tolerance of 1.0 μm for cladding diameter.

16. The six-port optical device of claim 15 wherein at least one dimension of the walls of said capillaries satisfies a manufacturing tolerance of 2.0 μm.

17. An optical subassembly comprising:
    a ferrule having at least one capillary extending axially through said ferrule; and
    at least one optical fiber positioned inside of said at least one capillary, said optical fiber satisfying a predetermined tolerance ovality, wherein the tolerance for ovality is equal to or less than about 0.8 percent.

18. The optical subassembly of claim 17, wherein the predetermined tolerance for ovality is equal to or less than about 0.4 percent.

19. The optical subassembly of claim 17, wherein the predetermined tolerance for ovality is equal to or less than about 0.12 percent.

* * * * *